United States Patent
Estakhri

(10) Patent No.: US 6,772,274 B1
(45) Date of Patent: Aug. 3, 2004

(54) FLASH MEMORY SYSTEM AND METHOD IMPLEMENTING LBA TO PBA CORRELATION WITHIN FLASH MEMORY ARRAY

(75) Inventor: Petro Estakhri, Pleasanton, CA (US)

(73) Assignee: Lexar Media, Inc., Fremont, CA (US)

( * ) Notice: Subject to any disclaimer, the term of this patent is extended or adjusted under 35 U.S.C. 154(b) by 292 days.

(21) Appl. No.: 09/660,838

(22) Filed: Sep. 13, 2000

(51) Int. Cl.$^7$ .............................................. G06F 12/00
(52) U.S. Cl. ......................... 711/103; 711/202; 711/209
(58) Field of Search ................................. 711/103, 202, 711/209

(56) References Cited

U.S. PATENT DOCUMENTS

| | | | |
|---|---|---|---|
| 4,498,146 A | 2/1985 | Martinez | 711/115 |
| 4,507,693 A | 3/1985 | Matsuda et al. | 360/72.2 |
| 4,907,162 A | 3/1990 | Fougere | 705/403 |
| 4,979,173 A | 12/1990 | Geldman et al. | 714/762 |
| 5,140,595 A | 8/1992 | Geldman et al. | 714/762 |
| 5,172,381 A | 12/1992 | Karp et al. | 714/775 |
| 5,200,959 A | 4/1993 | Gross et al. | 714/723 |
| 5,235,585 A | 8/1993 | Bish et al. | 369/54 |
| 5,255,136 A | 10/1993 | Machado et al. | 360/77.02 |
| 5,270,979 A | 12/1993 | Harari et al. | 365/218 |
| 5,271,018 A | 12/1993 | Chan | 714/710 |
| 5,283,882 A | 2/1994 | Smith et al. | 365/49 |
| 5,303,198 A | 4/1994 | Adachi et al. | 365/218 |
| 5,317,505 A | 5/1994 | Karabed et al. | 463/37 |
| 5,337,275 A | 8/1994 | Garner | 365/189.01 |
| 5,341,330 A | 8/1994 | Wells et al. | 365/185 |
| 5,341,339 A | 8/1994 | Wells | 365/218 |
| 5,357,475 A | 10/1994 | Hasbun et al. | 365/218 |
| 5,388,083 A | 2/1995 | Assar et al. | 365/218 |
| 5,455,721 A | 10/1995 | Nemazie et al. | 360/51 |
| 5,477,103 A | 12/1995 | Romano et al. | 318/601 |
| 5,479,638 A | 12/1995 | Assar et al. | 711/103 |
| 5,485,595 A | 1/1996 | Assar et al. | 711/103 |
| 5,500,848 A | 3/1996 | Best et al. | 369/275.3 |
| 5,523,724 A | 6/1996 | Assar et al. | 331/1 A |
| 5,523,903 A | 6/1996 | Hetzler et al. | 360/77.08 |
| 5,523,979 A | 6/1996 | Nemazie | 365/230.05 |
| 5,524,230 A | 6/1996 | Sakaue et al. | 711/103 |
| 5,544,356 A | 8/1996 | Robinson et al. | 707/205 |

(List continued on next page.)

FOREIGN PATENT DOCUMENTS

| | | |
|---|---|---|
| JP | 5-46461 | 2/1993 |
| JP | 5-233426 | 9/1993 |
| JP | 9-147581 | 6/1997 |
| JP | 10-79197 | 3/1998 |

*Primary Examiner*—Glenn Gossage
(74) *Attorney, Agent, or Firm*—Haverstock & Owens LLP

(57) ABSTRACT

A flash memory system is designed to reduce inefficiencies associated with keeping track of logical block address (LBA) to physical block address (PBA) correlation or mappmg—each logical block address generated by a host digital system and associated with data when the data is sent to be stored in the flash memory system by the host digital system. The flash memory system preferably comprises at least one flash memory device having a flash memory array, the flash memory array including a plurality, of blocks for storing data and for storing (LBA to PBA) correlation, each block having a plurality of sectors, and a controller coupled to each flash memory device, the controller including a new space manager. By removing from the space manager the task of tracking correlation between the LBA and the PBA, considerable savings in manufacturing costs and logic circuit area on an integrated circuit are achieved and design flexibility attained. The new space manager continues to keep track of the flags associated with the blocks in the flash memory system. However, sufficient blocks are specifically reserved for keeping track of the (LBA to PBA) correlation of the data stored in the flash memory system and are referred to as correlation blocks. In addition, the flash memory system avoids erase-before-write operations whenever possible during the process of keeping track of (LBA to PBA) correlation.

21 Claims, 14 Drawing Sheets

U.S. PATENT DOCUMENTS

| | | | |
|---|---|---|---|
| 5,566,314 A | 10/1996 | DeMarco et al. | 711/103 |
| 5,576,910 A | 11/1996 | Romano et al. | 360/77.08 |
| 5,579,502 A | 11/1996 | Konishi et al. | 711/103 |
| 5,581,723 A | 12/1996 | Hasbun et al. | 711/103 |
| 5,586,306 A | 12/1996 | Romano et al. | 711/112 |
| 5,596,526 A | 1/1997 | Assar et al. | 365/185.17 |
| 5,606,660 A | 2/1997 | Estakhri et al. | 395/183.14 |
| 5,678,056 A | 10/1997 | Nakamura | 709/228 |
| 5,696,775 A | 12/1997 | Nemazie et al. | 714/805 |
| 5,737,742 A * | 4/1998 | Achiwa | 711/103 |
| 5,740,358 A | 4/1998 | Geldman et al. | 714/47 |
| 5,768,043 A | 6/1998 | Nemazie et al. | 360/77.08 |
| 5,818,350 A | 10/1998 | Estakhri et al. | 340/825.52 |
| 5,818,781 A | 10/1998 | Estakhri et al. | 365/226 |
| 5,835,935 A * | 11/1998 | Estakhri et al. | 711/103 |
| 5,838,614 A * | 11/1998 | Estakhri et al. | 365/185.11 |
| 5,845,313 A | 12/1998 | Estakhri et al. | 711/103 |
| 5,848,438 A | 12/1998 | Nemazie et al. | 711/201 |
| 5,864,568 A | 1/1999 | Nemazie | 714/769 |
| 5,867,428 A | 2/1999 | Ishii et al. | 365/185.24 |
| 5,905,993 A * | 5/1999 | Shinohara | 711/103 |
| 5,907,856 A * | 5/1999 | Estakhri et al. | 711/103 |
| 5,909,596 A | 6/1999 | Mizuta | 710/63 |
| 5,920,731 A | 7/1999 | Pletl et al. | 710/14 |
| 5,924,113 A | 7/1999 | Estakhri et al. | 711/103 |
| 5,928,370 A | 7/1999 | Asnaashari | 714/48 |
| 5,930,815 A | 7/1999 | Estakhri et al. | 711/103 |
| 5,946,714 A * | 8/1999 | Miyauchi | 711/103 |
| 5,953,737 A | 9/1999 | Estakhri et al. | 711/103 |
| 5,966,720 A | 10/1999 | Itoh et al. | 711/1 |
| 6,018,265 A | 1/2000 | Keshtbod | 327/540 |
| 6,025,966 A | 2/2000 | Nemazie et al. | 360/53 |
| 6,026,293 A | 2/2000 | Osborn | 455/411 |
| 6,034,897 A | 3/2000 | Estakhri et al. | 365/185.33 |
| 6,040,997 A | 3/2000 | Estakhri | 365/185.33 |
| 6,041,001 A | 3/2000 | Estakhri | 365/200 |
| 6,073,205 A | 6/2000 | Thomson | 711/100 |
| 6,076,137 A * | 6/2000 | Asnaashari | 711/103 |
| 6,081,878 A * | 6/2000 | Estakhri et al. | 711/103 |
| 6,084,483 A | 7/2000 | Keshtbod | 331/57 |
| 6,115,785 A | 9/2000 | Estakhri et al. | 711/103 |
| 6,122,195 A | 9/2000 | Estakhri et al. | 365/185.11 |
| 6,125,435 A | 9/2000 | Estakhri et al. | 711/201 |
| 6,128,695 A | 10/2000 | Estakhri et al. | 711/103 |
| 6,134,151 A | 10/2000 | Estakhri et al. | 365/185.33 |
| 6,138,180 A | 10/2000 | Zegelin | 710/11 |
| 6,141,249 A | 10/2000 | Estakhri et al. | 365/185.11 |
| 6,144,607 A | 11/2000 | Sassa | 365/230.03 |
| 6,145,051 A | 11/2000 | Estakhri et al. | 711/103 |
| 6,151,247 A | 11/2000 | Estakhri et al. | 365/185.11 |
| 6,172,906 B1 | 1/2001 | Estakhri et al. | 365/185.11 |
| 6,173,314 B1 | 1/2001 | Kurashima et al. | 709/204 |
| 6,182,162 B1 | 1/2001 | Estakhri et al. | 710/11 |
| 6,202,138 B1 | 3/2001 | Estakhri et al. | 711/168 |
| 6,223,308 B1 | 4/2001 | Estakhri et al. | 714/42 |
| 6,230,234 B1 | 5/2001 | Estakhri et al. | 711/103 |
| 6,262,918 B1 | 7/2001 | Estakhri et al. | 365/185.33 |
| 6,314,480 B1 | 11/2001 | Nemazie et al. | 710/74 |
| 6,327,639 B1 | 12/2001 | Asnaashari | 711/103 |
| 6,339,831 B1 | 1/2002 | Sugawara et al. | 714/3 |
| 6,360,220 B1 | 3/2002 | Forin | 707/8 |
| 6,374,337 B1 | 4/2002 | Estakhri | 711/169 |
| 6,385,667 B1 | 5/2002 | Estakhri et al. | 710/8 |
| 6,393,513 B2 | 5/2002 | Estakhri et al. | 711/103 |
| 6,397,314 B1 | 5/2002 | Estakhri et al. | 711/168 |
| 6,404,246 B1 | 6/2002 | Estakhri et al. | 327/156 |
| 6,411,546 B1 | 6/2002 | Estakhri et al. | 365/185.11 |
| 6,484,216 B1 | 11/2002 | Zegelin | 710/11 |
| 6,490,649 B2 | 12/2002 | Sinclair | 711/103 |

* cited by examiner

| | | VPBA 610 | VPBA 615 | VPBA 620 | | VPBA 630 | ECC 635 | FLAGS 636 | SPARE 640 | |
|---|---|---|---|---|---|---|---|---|---|---|
| Correlation Block 0 | Sector 0 | (LBA 0: N-1) | (LBA N: 2N-1) | (LBA 2N: 3N-1) | ○ ○ ○ | LBA (Y-1)N: YN-1 | ECC | FLAGS | SPARE | 642 |
| | Sector 1 | (LBA 0: N-1) | (LBA N: 2N-1) | (LBA 2N: 3N-1) | ○ ○ ○ | LBA (Y-1)N: YN-1 | ECC | FLAGS | SPARE | 643 |
| | | ○ ○ ○ | ○ ○ ○ | ○ ○ ○ | ○ ○ ○ | LBA (Y-1)N: YN-1 | ○ ○ ○ | ○ ○ ○ | ○ ○ ○ | |
| | Sector (N-1) | (LBA 0: N-1) | (LBA N: 2N-1) | (LBA 2N: 3N-1) | ○ ○ ○ | LBA (Y-1)N: YN-1 | ECC | FLAGS | SPARE | 644 |
| Correlation Block 1 | Sector 0 | (LBA 0: N-1) | (LBA N: 2N-1) | (LBA 2N: 3N-1) | ○ ○ ○ | LBA (Y-1)N: YN-1 | ECC | FLAGS | SPARE | 646 |
| | Sector 1 | (LBA 0: N-1) | (LBA N: 2N-1) | (LBA 2N: 3N-1) | ○ ○ ○ | LBA (Y-1)N: YN-1 | ECC | FLAGS | SPARE | 647 |
| | | ○ ○ ○ | ○ ○ ○ | ○ ○ ○ | ○ ○ ○ | LBA (Y-1)N: YN-1 | ○ ○ ○ | ○ ○ ○ | ○ ○ ○ | |
| | Sector (N-1) | (LBA 0: N-1) | (LBA N: 2N-1) | (LBA 2N: 3N-1) | ○ ○ ○ | LBA (Y-1)N: YN-1 | ECC | FLAGS | SPARE | 648 |
| Correlation Block 2 | Sector 0 | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 650 |
| | Sector 1 | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 651 |
| | | ○ ○ ○ | ○ ○ ○ | ○ ○ ○ | ○ ○ ○ | LBA Y+(Z-1)N: Y+ZN-1 | ○ ○ ○ | ○ ○ ○ | SPARE | |
| | Sector (N-1) | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 652 |
| Correlation Block 3 | Sector 0 | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 654 |
| | Sector 1 | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 655 |
| | | ○ ○ ○ | ○ ○ ○ | ○ ○ ○ | ○ ○ ○ | LBA Y+(Z-1)N: Y+ZN-1 | ○ ○ ○ | ○ ○ ○ | ○ ○ ○ | |
| | Sector (N-1) | (LBA Y: Y+N-1) | (LBA Y+N: Y+2N-1) | (LBA Y+2N: Y+3N-1) | ○ ○ ○ | LBA Y+(Z-1)N: Y+ZN-1 | ECC | FLAGS | SPARE | 656 |

680 DATA BLOCKS

*Fig. 6*

| | | 2 Bytes VPBA | ●●●●●●● | 2 Bytes VPBA | 4 Bytes ECC | SPARE |
|---|---|---|---|---|---|---|
| 1302 Correlation Block 0 | Sector 0 | (LBA 0:15) | ●●●●●●● | (LBA 4080: 4095) | | |
| | ⋮ | ⋮ | ⋮ | ⋮ | | |
| | Sector 15 | (LBA 0:15) | ●●●●●●● | (LBA 4080: 4095) | | |
| 1322 Correlation Block 1 | Sector 0 | (LBA 0:15) | ●●●●●●● | (LBA 4080: 4095) | | |
| | ⋮ | ⋮ | ⋮ | ⋮ | | |
| | Sector 15 | (LBA 0:15) | ●●●●●●● | (LBA 4080: 4095) | | |
| 1304 Correlation Block 2 | Sector 0 | (LBA 4096: 4111) | ●●●●●●● | (LBA 8176: 8191) | | |
| | ⋮ | ⋮ | ⋮ | ⋮ | | |
| | Sector 15 | (LBA 4096: 4111) | ●●●●●●● | (LBA 8176: 8191) | | |
| 1324 Correlation Block 3 | Sector 0 | (LBA 4096: 4111) | ●●●●●●● | (LBA 8176: 8191) | | |
| | ⋮ | ⋮ | ⋮ | ⋮ | | |
| | Sector 15 | (LBA 4096: 4111) | ●●●●●●● | (LBA 8176: 8191) | | |
| 1306 Correlation Block 4 | Sector 0 | (LBA 8192: 8207) | ●●●●●●● | (LBA 12,272: 12,287) | | |
| | ⋮ | ⋮ | ⋮ | ⋮ | | |
| | Sector 15 | (LBA 8192: 8207) | ●●●●●●● | (LBA 12,272: 12,287) | | |
| 1326 Correlation Block 5 | Sector 0 | (LBA 8192: 8207) | ●●●●●●● | (LBA 12,272: 12,287) | | |
| | ⋮ | ⋮ | ⋮ | ⋮ | | |
| | Sector 15 | (LBA 8192: 8207) | ●●●●●●● | (LBA 12,272: 12,287) | | |
| 1308 Correlation Block 6 | Sector 0 | (LBA 12,288: 12,303) | ●●●●●●● | (LBA 16,368: 16,383) | | |
| | ⋮ | ⋮ | ⋮ | ⋮ | | |
| | Sector 15 | (LBA 12,288: 12,303) | ●●●●●●● | (LBA 16,368: 16,383) | | |
| 1328 Correlation Block 7 | Sector 0 | (LBA 12,288: 12,303) | ●●●●●●● | (LBA 16,368: 16,383) | | |
| | ⋮ | ⋮ | ⋮ | ⋮ | | |
| | Sector 15 | (LBA 12,288: 12,303) | ●●●●●●● | (LBA 16,368: 16,383) | | |
| | | Data Blocks | | | | |

*Fig. 13*

FLASH MEMORY SYSTEM AND METHOD IMPLEMENTING LBA TO PBA CORRELATION WITHIN FLASH MEMORY ARRAY

FIELD OF THE INVENTION

The present invention relates to the field of flash memory systems. More particularly, the present invention relates to flash memory systems implementing logical block address (LBA) to physical block address (PBA) correlation within a flash memory array.

BACKGROUND OF THE INVENTION

Flash memory technology is an electrically rewritable nonvolatile digital memory technology that does not require a power source to retain its memory contents. A typical flash memory cell stores charge on a floating gate to represent a first logic state in the binary state system, while the lack of stored charge represents a second logic state in the binary state system. Additionally, a typical flash memory implementation is capable of supporting a write operation, a read operation, and an erase operation.

As flash memory technology has evolved, opportunities in a variety of applications have become possible. In particular, flash memory implementations that emulate the mass storage function of conventional rotating magnetic media, e.g., a hard disk drive or a floppy disk drive, coupled to a host computer system or other host digital system have gained wide acceptance. Hard disk drives and floppy disk drives suffer several deficiencies unseen in flash memory implementations. First, hard disk drives and floppy disk drives have many moving parts, i.e. an electrical motor, a spindle shaft, a read/write head, and a magnetizable rotating disk. These components give rise to reliability problems and magnify the hard disk drive's and floppy disk drive's susceptibility to failure resulting from the vibration and shock of being dropped or bumped. Secondly, hard disk drives and floppy disk drives consume a significant amount of power, thus quickly draining a portable computer's battery. Finally, accessing data stored in the hard disk drive or the floppy disk is a relatively slow process.

In contrast, a typical flash memory system possesses many advantages over the hard disk drive and the floppy disk drive. The typical flash memory system has no moving parts, accounting for the higher reliability of the typical flash memory system. In addition, the rugged design of the typical flash memory system withstands environmental conditions and physical mishandling that would otherwise be catastrophic to the hard disk drive or the floppy disk drive. Generally, a user can access data stored in the typical flash memory system fairly quickly. Most significantly, the power consumption of the typical flash memory system is considerably lower than the hard disk drive's and the floppy disk drive's power consumption.

Although the typical flash memory system is ideally suited for mass storage applications, several properties associatedwith flash memory technology prevent the typical flash memory system from exactly replicating a data storage procedure implemented by the hard disk drive and the floppy disk drive. Maintaining compatibility with the data storage procedure implemented by the hard disk drive and the floppy disk drive is essential to the market success of the typical flash memory system because existing operating systems and existing application software are configured to operate with the data storage procedure implemented by the hard disk drive and the floppy disk drive.

One unique property of flash memory technology lies in the tendency of the typical flash memory cell to wear-out. This wearing-out property makes the typical flash memory cell unusable after a finite number of erase-write cycles. The data storage procedure implemented by the typical flash memory system must deal effectively with this finite life span of the typical flash memory cell.

Another unique property of flash memory technology is the inability to program the typical flash memory cell, if the typical flash memory cell is currently storing a particular logic state, without first performing the erase operation to erase the particular logic state before performing the write operation. Old data stored in the typical flash memory cell must be erased before attempting to program/write new data into the typical flash memory cell. Further limiting the performance of the typical flash memory system is the reality that the erase operation is a very time consuming operation relative to either the write operation or the read operation. Not only does the erase operation entail erasing the typical flash memory cell but additionally can results in the overerasure of the typical flash memory cell.

The data storage procedure implemented by the typical flash memory system minimizes the degradation in system performance associated with simply replicating the data storage procedure implemented by the hard disk drive and the floppy disk drive. The typical flash memory system endeavors to avoid writing the new data, or current version of data, in the typical flash memory cell storing the old data, or old version of the data, whenever possible to avoid performing the erase operation, unlike the hard disk drive and the floppy disk drive where the new data, or the current version of the data, is routinely programmed/written in a memory cell storing the old data, or the old version of the data. By writing the new data in an empty flash memory cell and by designating the typical flash memory cell which stores the old data as requiring the erase operation at a future convenient time, the typical flash memory system avoids performing the erase operation now, thus enhancing system performance. Additionally, to prevent certain typical flash memory cells from wearing-out and becoming unusable sooner than other typical flash memory cells, the typical flash memory system incorporates a wear leveling feature to regulate the usage—the number of erase-write cycles—of the typical flash memory cells such that all storage regions of the typical flash memory system wear-out at a fairly consistent rate. The hard disk drive and the floppy disk drive do not require this wear leveling feature because their storage mechanisms can undergo a practically unlimited number of program/write operations without impacting performance.

The typical flash memory system comprises at least one typical flash memory device. FIG. 1 illustrates the arrangement of the typical flash memory cells in the typical flash memory device. A flash memory array 100 comprising typical flash memory cells functions as a nonvolatile mass memory component of the typical flash memory device. The flash memory array 100 is divided into a plurality of data blocks 102, . . . , 106 for storing data. The data blocks 102, . . . , 106 are conventionally labeled from zero to M−1, where M is the total number of data blocks 102 . . . , 106. Each data block 102, . . . , 106 is uniquely assigned a virtual physical block address (VPBA), the VPBA representing the typical flash memory system's method of identifying and addressing the data blocks 102, . . . , 106 inside the typical flash memory device. Usually, each data block 102, . . . , 106 is selectively programmable and erasable. Furthermore, each data block 102, . . . , 106 includes a plurality of sectors 112, ..., 136. Within each data block 102, ..., 106, the sectors 112, ..., 136 are conventionally labeled from zero to N−1, where N is the number of sectors within each data block 102, ..., 106. Since the data blocks 102, ..., 106 comprise typical flash memory cells, the data blocks 102, ..., 106 are nonvolatile, i.e., the data stored in the data blocks 102, ..., 106 is retained even when power is cut off.

FIG. 2 illustrates the features of the sector 200 found in each data block. Typically, the sector 200 includes a plurality of fields 202, ..., 212. A DATA field 202 is utilized for storing user data. Although the size of the DATA field 202 is typically five hundred twelve bytes which corresponds with a storage sector length in a commercially available hard disk drive or floppy disk drive, the DATA field 202 can be configured to be practically any length of bytes. An extension field 204, typically sixteen bytes, is seen to comprise an ECC field 206 for storing Error Correcting Code information associated with the DATA field 202 and is typically a length of four bytes. A virtual logical block address (VLBA) associated with the data stored in the DATA field 202 is typically stored in a LOGICAL BLOCK ADDRESS field 208 of only one sector 200 in each block 102, ..., 106. Rather than storing all the bits of the LBA associated with the data stored in the DATA field 202 of a particular sector 200, only the higher order bits defining the VLBA are stored in the LOGICAL BLOCK ADDRESS field 208. Data from each of the component LBA's which comprise the VLBA are stored in component sectors 112, ..., 136 of data blocks' PBA's which comprise a VPBA in a manner which maintains correlation between the PBA's and the LBA's. This process is performed in conjunction with the space manager 300 discussed in greater detail in conjunction with FIG. 3. An incoming LBA of User Data has an address of higher order bits defining the general VLBA, and lower order bits defining the specific LBA. By initially masking the lower order bits, the processor defines the VLBA according to the higher order bits. The VLBA is then correlated to a specific VPBA of a Data Block 102, ..., 106 through the space manager 300. Once the VLBA has been correlated to a VPBA, component LBA's within a VLBA are then stored in component PBA's of the corresponding VPBA through a concatenation process. The lower order bits of an incoming LBA are concatenated onto the VPBA to form a PBA defining a particular sector 112, ..., 136 within a Data Block 102, ..., 106. The logical block of incoming data is stored in that sector. In the data retrieval process, a similar process occurs. A host requests retrieval of a specific LBA. Again, the lower order bits are masked, and the higher order bits define the more general VLBA. Again, the VLBA is correlated to a VPBA through the space manager 300. When the Data Block 102, ..., 106 defined by the VPBA is located, the lower order bits of the requested LBA are concatenated on the VTBA to form a PBA defining the exact sector 1 12, ..., 136 where the data had been stored. The data is retrieved and sent to the host, defined according to the LBA by which the host requested it.

Because the masking and concatenation process briefly described above insures that the lower order bits of the logical address are the same as the lower order bits of the physical address, there is no need to store a correlation of the lower order bits. Accordingly, only the higher order bits comprising the VLBA are actually stored in the LOGICAL BLOCK ADDRESS field 208 of a physical sector 200. As a result, the LOGICAL BLOCK ADDRESS field 208 is typically a length of two bytes. However, this length can be increased or decreased depending on the amount of addressable storage capacity supported by the typical flash memory system. Because all of the sectors 112, ..., 136 within a block 102, ..., 106 of memory would store the same VLBA within their respective LOGICAL BLOCK ADDRESS, field 208, typically, the VLBA is stored in the LOGICAL BLOCK ADDRESS field 208 of only one sector 112, ..., 136 per Data Block 102, ..., 106.

A FLAG field 210 is employed for storing a plurality of flags pertaining to conditions of the data block of which the sector 200 is a part. The flags stored in the FLAG field 210 include a defective block flag, an old/new block flag for indicating if stored data is obsolete, and a used/free block flag. Also, the FLAG field 210 is typically a length of one byte. Finally, the sector 200 usually includes a plurality of SPARE bits 212 which are utilized when needed.

As described above, the typical flash memory system performs a data storage algorithm purposely designed to overcome the limitations of flash memory technology while retaining compatibility with existing operating systems and existing application software. One technique for implementing the data storage algorithm involves employing a space manager component to maintain a correlation between a virtual logical block addresses (VLBA) and a virtual physical block addresses (VPBA) of data stored in the typical flash memory system.

Because data cannot be re-programmed into a Flash Memory System without first engaging an erase process, an update of even a single LBA within a VLBA requires that the entire VLBA be re-written in a new Data Block 102, ..., 106. As a result, a distinctive characteristic of the data storage algorithm implemented by the typical flash memory system lies in the continuously changing relation between the LBA and the PBA. Unlike the conventional rotating magnetic media where the LBA to PBA correlation is static because updated versions of the data are programmed over old versions of the data, the typical flash memory system must change the correlation between the LBA and the PBA because the updated versions of the data are programmed into empty memory locations—inevitably having PBAs that are different from the PBA originally assigned to the LBA—rather than being programmed over the old versions of the data in memory locations having the PBA originally assigned to the LBA. As noted, the space manager 300 plays a critical role in coordinating LBA-to-PBA correlation in the typical flash memory system.

A host digital system, to which the typical flash memory system is coupled and to which the typical flash memory system provides nonvolatile mass storage, maintains organization of the data sent to the typical flash memory system by generating the LBA and associating the LBA with the data. The LBA is a logical address where the host digital system believes the data is stored in the typical flash memory system. Once the typical flash memory system receives the data and the LBA, the typical flash memory system transforms the LBA into the PBA, where the PBA is a physical address of the data block and a specific sector wherein the data is actually stored. As described above, each data block includes a plurality of sectors. Since the VPBA only refers to the data block rather than the actual sector storing the data within the data block, further reference must be made to the LBA to determine which sector within the data block stores the data. As noted, this involves the concatenation of a plurality of lower order bits of an LBA onto the lower end of the VPBA, thereby defining a PBA or physical address of the sector storing the data associated with the LBA. Each LBA within a VLBA is transformed into the physical address (the PBA) of one of the sectors. Hence, the typical flash memory system supports and recognizes a quantity of LBAs equal to the total number of sectors in the typical flash memory system. The bit length of the LBAs and the PBAs is directly related to the addressable storage capacity supported by the host digital system and the typical flash memory system.

Maintaining the correlation between LBAs and PBAs of the data stored in the typical flash memory system is critical to the proper operation of the typical flash memory system since the host digital system is generally not configured to track continually changing PBAs of the data stored in the typical flash memory system. The typical flash memory system transforms the LBA into the PBA upon initially receiving the data. Moreover, the typical flash memory system assigns an updated LBA to an entirely new PBA defining a sector 112, ..., 136 which is part of an entirely new Data Block 102, ..., 106 since it cannot program new data into an old PBA without first implementing an erase procedure. The procedure of storing updated data in a new physical location avoids the need to perform an erase-before-write cycle with each data update. As noted, the erase-before-write cycle degrades system performance. Reducing the number of the erase-before-write cycles improves system performance. As described above, if the typical flash memory cells are storing data, they can be reprogrammed only after the flash memory cells have been erased.

Refer to FIG. 3 for an illustration of the space manager 300 identified above. Typically, the space manager 300 is implemented as a volatile RAM array, the volatile RAM array including a plurality of volatile addressable memory locations 350, ..., 358. Each volatile addressable memory location 350, ..., 358 corresponds to one of the data blocks 102, ..., 106 (FIG. 1) in the typical flash memory system and stores information about the corresponding data block 102, ..., 106 (FIG. 1). FIG. 1. illustrated the data blocks 102, ..., 106 conventionally labeled from zero to M−1. Similarly, the volatile addressable memory locations 350, ..., 358 are conventionally labeled from zero to M−1 to reflect a label of the corresponding data block 102, ..., 106 (FIG. 1). Additionally, each volatile addressable memory location 350, ..., 358 is addressable by at least one of the VLBAs 360, ..., 368 received from the host digital system and by one of the VPBAs 312, ..., 320 of the typical flash memory system. Each volatile addressable memory location 350, ..., 358 includes a plurality of fields 310, ..., 340. Typically, the space manager 300 comprises static random access memory (SRAM) cells. However, other memory cells can be substituted for the SRAM cells.

Generally, the space manager 300 serves two purposes. First, the correlation between the virtual logical block address (VLBA) and the virtual physical block address (VPBA) of the data stored in the typical flash memory system is tracked in the space manager 300, giving the typical flash memory system rapid access to this crucial correlation information. A VPBA field 310 stores the VPBA assigned to the VLBA associated with the data received from the host digital system, where the VPBA is the address of the data block 102, ..., 106 (FIG. 1) used to store data associated with a VLBA. The length of the VPBA field 310 is directly related to the addressable storage capacity supported by the typical flash memory system. Typically, the VPBA field 310 is a length of two bytes. Secondly, the typical flash memory system employs the space manager 300 to keep track of the flags associated with the data blocks 102, ..., 106 (FIG. 1). Since each volatile addressable memory location 350, ..., 358 corresponds to one of the data blocks 102, ..., 106 (FIG. 1), the flags associated with the corresponding data block 102, ..., 106 (FIG. 1) are maintained in flag fields 320, ..., 340 within the volatile addressable memory location 350, ..., 358. As described above, these flags include the defective block flag 320, the old/new or obsolete block flag 330, and the used/free block flag 340. Setting the defective block flag 320 of the data block 102, ..., 106 (FIG. 1) causes the flash memory system to avoid storing the data in any of the sectors in the data block 102, ..., 106 (FIG. 1) since the entire data block 102, ..., 106 (FIG. 1) is deemed defective. Setting the used/free block flag 340 of the data block 102, ..., 106 (FIG. 1) indicates the data block 102, ..., 106 (FIG. 1) is currently storing data. An untransformed LBA would not be assigned a PBA of a sector within a data block 102, ..., 106 (FIG. 1) currently storing data. Setting the old/new block flag 330 of the data block 102, ..., 106 (FIG. 1) indicates the data block 102, ..., 106 (FIG. 1) is storing an old version of the data, thus the data block 102, ..., 106 (FIG. 1) must be erased before the data block 102, ..., 106 (FIG. 1) can again be utilized for storing additional data.

In practice, when data defined by an LBA is received for the first time, the typical flash memory system utilizes the space manager 300 to search for the data block with an unset defective block flag 320 and an unset used/free block flag 340 for storing the data. The data is stored in the data block with the unset defective block flag 320 and the unset used/free block flag 340. In addition the VPBA of the data block with the unset defective block flag 320 and the unset used/free block flag 340 is stored in the VPBA field 310 of the volatile addressable memory location 350, ..., 358 addressable by the VLBA 360, ..., 368. The typical flash memory system also sets the used/free block flag 340 of the volatile addressable memory location 350, ..., 358 addressable by the VPBA 312, ..., 320 of the data block storing the data.

When the LBA and updated versions of the data are received such that the typical flash memory system must change a current PBA assigned to the LBA, the typical flash memory system proceeds as described above, thus avoiding the erase-before-write cycle. In addition, the typical flash memory system sets the old/new block flag 330 of the volatile addressable memory location 350, ..., 358 addressable by the current VPBA 312, ..., 320 to prevent the typical flash memory system from accessing unneeded versions of the data stored in the current PBA.

Also, the typical flash memory system employs the space manager 300 in performing the read operation. After the host digital system provides the LBA associated with requested data, the typical flash memory system locates the PBA assigned to the LBA by reading the contents of the VPBA field 310 of the volatile addressable memory location 350, ..., 358 addressable by the LBA 360, ..., 368. The typical flash memory system reads out the requested data from the data block whose PBA is assigned to the provided LBA.

Additionally, the space manager 300 assists the typical flash memory system in executing the erase operation. The typical flash memory system can perform the erase operation in the background, i.e., while another operation is being performed, or when necessary. Before initiating the erase operation, the typical flash memory system uses the space manager 300 to search for the data blocks having a set old/new block flag 330 and an unset defective block flag 320—these data blocks need to be erased. This search is conducted by examining the flag fields 320 and 330 (defective block and old/new or obsolete block) of the volatile addressable memory locations 350, ..., 358. The typical flash memory system erases the data blocks having the set old/new block flag 330 and the unset defective block flag 320.

Due to the volatile nature of the space manager 300—loss of power causes the volatile RAM array to lose its memory contents—, the information stored in the flag fields 320, . . . , 340 of each volatile addressable memory location 350, . . . , 358 is also stored in the FLAG field 210 (FIG. 2) of the corresponding data block. As noted, each VLBA having an assigned VPBA is stored in the LOGICAL BLOCK ADDRESS field 208 (FIG. 2) of the data block corresponding to the assigned VPBA. A distinct advantage of this feature rests in the non-volatile nature of the flash memory. Since the data blocks are nonvolatile, loss of power has no effect on the memory contents of the data blocks. This provides a non-volatile correlation between logical and physical addresses in the event of power loss.

During a power-up and during a system reset, the typical flash memory system restores the memory contents of the space manager 300. The FLAG field 210 (FIG. 2) of each data block is used to update the flag fields 320, . . . , 340 of the corresponding volatile addressable memory location 350, . . . , 358. Because a certain logical address is stored in the LOGICAL BLOCK ADDRESS field 208 (FIG. 2) of a sector of a particular data block 102, . . . , 106, during power-up or system reset, the controller is able to load the VPBA of the particular data block 102, . . . , 106 into an appropriate volatile addressable memory location 350, . . . , 358 corresponding to the appropriate VLBA 360, . . . , 368.

To control the operations of the typical flash memory system, the typical flash memory system further comprises a controller coupled to the typical flash memory device. Since the space manager 300 is an integral part of the operations performed by the typical flash memory system, the space manager 300 is typically designed within the controller. This increases system performance. Usually, the controller is formed on an integrated circuit separate from that on which the typical flash memory device is formed since the silicon area necessary for a large addressable storage capacity would generally make economically unfeasible formation of both the controller and the typical flash memory device on an identical integrated circuit. Additionally, formation of the controller on the separate integrated circuit allows the implementation of the controller in a manufacturing technology more suited for the performance demands placed on the controller by the typical flash memory system.

Although the space manager 300 enables the typical flash memory system to achieve superior performance, this superior performance, is attained at a significant cost in silicon area on the integrated circuit on which the controller is formed. Assume, for exemplary purposes only, a 64 MegaBit configuration for the typical flash memory system will enhance understanding of the problems associated with the space manager 300 of the prior art. The 64 MegaBit flash memory system comprises one 64 MegaBit flash memory device having 1024 data blocks, each data block including 16 sectors. This flash memory system supports 16,384 LBAs. The space manager 300 of the 64 MegaBit flash memory system will have 1024 volatile addressable memory locations 350, . . . , 358. The column containing the VPBA field 310 (which is two bytes in length) will occupy:

| (Number of data blocks) | * | (Bit size of the VPBA field) = | |
|---|---|---|---|
| (1024) | * | (16 bits) = | 16,384 bits | of volatile RAM memory space within the space manager 300. Although a length of 10 bits for the VPBA field 310 would be sufficient to store unique physical block addresses for the 1024 data blocks, manipulating PBAs which are identified in byte lengths (8 bits or multiples of 8 bits) optimizes operation of the typical flash memory system. Additionally, the 16 bit length of the VPBA field 310 accommodates expansion of the addressable storage capacity supported by the controller.

Unfortunately, the size of the space manager 300 within the controller increases significantly as the typical flash memory system is configured to support a larger amount of addressable storage capacity, as demonstrated by the calculations below.

TABLE 1

Relation between memory size of the flash memory system and the memory size of the VPBA column in the space manager.

| Size of flash memory system | [ (Number of data blocks) * (Bit size of VPBA field) ] | | Size of VPBA column |
|---|---|---|---|
| 64 MegaByte: | [ (8192) * (16 bits) ] | = | 131,072 bits |
| 128 MegaByte: | [ (16,384) * (16 bits) ] | = | 262,144 bits |
| 256 MegaByte: | [ (32,768) * (16 bits) ] | = | 524,288 bits |
| 512 MegaByte: | [ (65,536) * (16 bits) ] | = | 1,048,576 bits |
| 1 GigaByte: | [ (131,072) * (24 bits) ] | = | 3,145,728 bits |

Focusing on the 64 MegaByte flash memory system in TABLE 1, this flash memory system comprises eight 64 MegaBit flash memory devices. Similarly, the 128 MegaByte, 256 MegaByte, 512 MegaByte, and 1 GigaByte flash memory systems comprise a plurality of flash memory devices configured to store an appropriate amount of data. For the 1 GigaByte flash memory system, the length of the VPBA field 310 (FIG. 3) increased to 24 bits because 17 bits are required in order to store unique physical block addresses for the 131,072 data blocks and because a length of 3 bytes (24 bits) is the next available byte size. As is evident from TABLE 1, it is unpractical to implement space managers 300 (FIG. 3) of equivalent memory size in both large memory capacity and small memory capacity flash memory systems. Such implementation would increase the cost of the typical flash memory system and waste valuable silicon area on the integrated circuit on which the controller is formed. Hence, controllers having space managers 300 (FIG. 3) of vastly different memory sizes are required in order for the typical flash memory system to economically support increasing amounts of addressable storage capacity. In essence, the utility of the controller is limited by the size of the space manager 300 (FIG. 3).

What is needed is a new flash memory system implementing a new technique of keeping track of logical block address to physical block address correlation in order to reduce the logic circuit area devoted for the space manager in the controller and to expand the utility of the controller across a wide range of flash memory sizes.

SUMMARY OF THE INVENTION

The present invention is a flash memory system designed to reduce inefficiencies associated with keeping track of logical block address (LBA) to physical block address (PBA) correlation as practiced in the prior art—each logical block address generated by a host digital system and associated with data when the data is sent to be stored in the flash memory system by the host digital system. The flash memory system preferably comprises at least one flash memory device having a flash memory array, the flash memory array including a plurality of blocks for storing data and for storing a LBA-to-VPBA correlation, each block having a plurality of sectors, and a controller coupled to each flash memory device, the controller including a new space manager. By removing from the space manager of the prior art the task of tracking correlation between the LBA and the PBA of the data stored in the typical flash memory system of the prior art, considerable savings in manufacturing costs and logic circuit area on an integrated circuit are achieved and design flexibility attained. The new space manager of the present invention continues to keep track of the flags associated with the blocks in the flash memory system of the present invention. However, sufficient blocks are specifically reserved for keeping track of the LBA-to-VPBA correlation of the data stored in the flash memory system of the present invention and are referred to as correlation blocks. Each correlation block is configured to store the physical block addresses corresponding to a predetermined range of logical block addresses. Thus, each correlation block is associated with a predetermined range of logical block addresses although the physical block addresses are the addresses actually stored in each correlation block. Since the correlation blocks maintain their contents even when power is turned off, there is no need to maintain copies of the contents of the correlation blocks in other memory locations within the flash memory system.

To optimize performance of the flash memory system of the present invention, an erase-before-write cycle, i.e., performing an erase operation immediately before performing a write operation, is avoided whenever possible during the process of maintaining in the correlation blocks an accurate and updated correlation between the LBA and the PBA of the data stored in the flash memory system of the present invention. In particular, new correlation information, i.e., the new LBA-to-VPBA relation, is programmed into a free sector of an appropriate correlation block, i.e., a correlation block associated with the predetermined range of logical block addresses which includes the LBA or LBAs affected by the new correlation information, rather than erasing and then programming a previously programmed sector of the appropriate correlation block.

Each predetermined range of logical block addresses is associated with a current sector. Each current sector stores current correlation information, i.e., current LBA-to-VPBA relations, relating to the logical block addresses within the associated predetermined range of logical block addresses. In addition to programming the new correlation information into the free sector of the appropriate correlation block, the flash memory system of the present invention also simultaneously programs unchanged correlation information, i.e., unchanged LBA-to-VPBA relations, from the current sector into the free sector of the appropriate correlation block.

Programming correlation information, i.e., LBA-to-VPBA relations, into the correlation block is crucial to the proper operation of the flash memory system of the present invention. By coordinating a first programming operation, i.e., programming the data into an appropriate data block, and a second programming operation, i.e. programming the correlation information of the data into the appropriate correlation block, the flash memory system of the present invention optimizes system performance which would otherwise deteriorate because multiple programming operations are executed in the flash memory device, unlike the prior art where only the data has to be programmed into the typical flash memory device. In particular, programming the correlation information into the appropriate correlation block is kept as much as possible in the background, i.e., performed while another operation is being performed, or relegated to periods of system inactivity, i.e., performed when no other operation is being performed.

The flash memory system of the present invention preferably includes at least one alternate correlation block. Configured similarly to the correlation blocks, each alternate correlation block is associated with a primary correlation block and stores the physical block addresses corresponding to the predetermined range of logical block addresses associated with the primary correlation block. By having the alternate correlation block, the flash memory system of the present invention can store in the free sector of the alternate correlation block the new correlation information and the unchanged correlation information from the current sector when the free sector is not found in the primary correlation block. As a result, the flash memory system of the present invention avoids erasing the primary correlation block until a more convenient and, efficient time. Since the primary correlation block is erased before the alternate correlation block is completely filled, the primary correlation block is again available for storing the correlation information when the alternate correlation block is filled.

Additionally, the flash memory system of the present invention includes components for tracking each current sector and means for allocating a nondefective block to replace a defective correlation block. Having the components for tracking each current sector eliminates the need for performing read operations on the correlation block each time the flash memory system of the present invention accesses the correlation block in order to determine the free sector, thus improving system performance. Once a block is flagged as defective, the flash memory system of the present invention avoids accessing the defective block. Unlike the other blocks, correlation blocks are essential to the flash-.memory system of the present invention. Hence, the nondefective block must be assigned to replace permanently the defective correlation block, a task accomplished by the means for allocating.

If the flash memory system of the present invention includes more than one flash memory device, system performance is enhanced by keeping track of the correlation between the LBAs and the PBAs of the data stored in a first flash memory device in the correlation block of a second flash memory device while keeping track of the correlation between the LBAs and the PBAs of the data stored in the second flash memory device in the correlation block of the first flash memory device. This technique maximizes system performance because the data and the correlation information can be programmed concurrently. Proceeding according to this technique enables the flash memory system of the present invention to program the correlation information relating to the data being stored in the first flash memory device into the correlation block of the second flash memory device while concurrently programming the data into the data block of the first flash memory device. Similarly, the flash memory system of the present invention can program the correlation information relating to the data being stored in the second flash memory device into the correlation block of the first flash memory device while concurrently programming the data into the data block of the second flash memory device.

BRIEF DESCRIPTION OF THE DRAWINGS

FIG. 6 illustrates a configuration of correlation blocks-in a flash memory system according to a first preferred embodiment of the present invention.

FIG. 13 illustrates a configuration of correlation blocks in a 64 MegaBit flash memory system according to a first preferred embodiment of the present invention.

DETAILED DESCRIPTION OF THE PREFERRED EMBODIMENT

The flash memory system of the present invention incorporates a flash memory architecture which keeps track of logical block address (LBA) to physical block address (PBA) correlation within a nonvolatile mass memory component rather than in a volatile specialized memory component as practiced in the prior art. This implementation is stable, i.e., interruptions in power supplied to the flash memory system will not wipe out a current representation of the VLBA-to-VPBA correlation in the nonvolatile mass memory component, unlike the prior art where loss of power wipes out the current representation of the VLBA-to-VPBA correlation in the volatile specialized memory component thus necessitating the typical flash memory system of the prior art to undertake a series of operations to reconstruct the current representation of the VLBA-to-VPBA correlation in the volatile specialized memory component. The flash memory system of the present invention exhibits qualities superior to the typical flash memory system of the prior art. For instance, the flash memory system avoids the costs associated with dedicating increasing amounts of memory space to the volatile specialized memory component as addressable storage capacity supported by the flash memory system is expanded. Additionally, the flash memory system features a measure of flexibility in dealing with limitations of flash memory technology, such as the proneness of flash memory cells to wear-out and the necessity of performing an erase operation on the flash memory cells before reprogramming the flash memory cells. More particularly, a greater number of design options are available for the flash memory system, thus making possible cost effective specialized designs for the flash memory system for a variety of storage applications.

In its proper operating environment, the flash memory system is coupled to a host digital system, such as a host computer system, and provides nonvolatile mass storage for use by the host digital system. Data to be stored in or to be read from the flash memory system is associated by the host digital system with one of a plurality of logical block addresses generated by the host digital system. The flash memory system transforms the logical block address into one of a plurality of physical block addresses—refer to the "Background of the Invention" for a discussion of the need for this transformation.

Preferably, the flash memory system comprises at least one flash memory device for storing the data and correlation information, i.e., LBA-to-VPBA relations, and a controller for controlling operations performed by the flash memory system.

Figure 1:
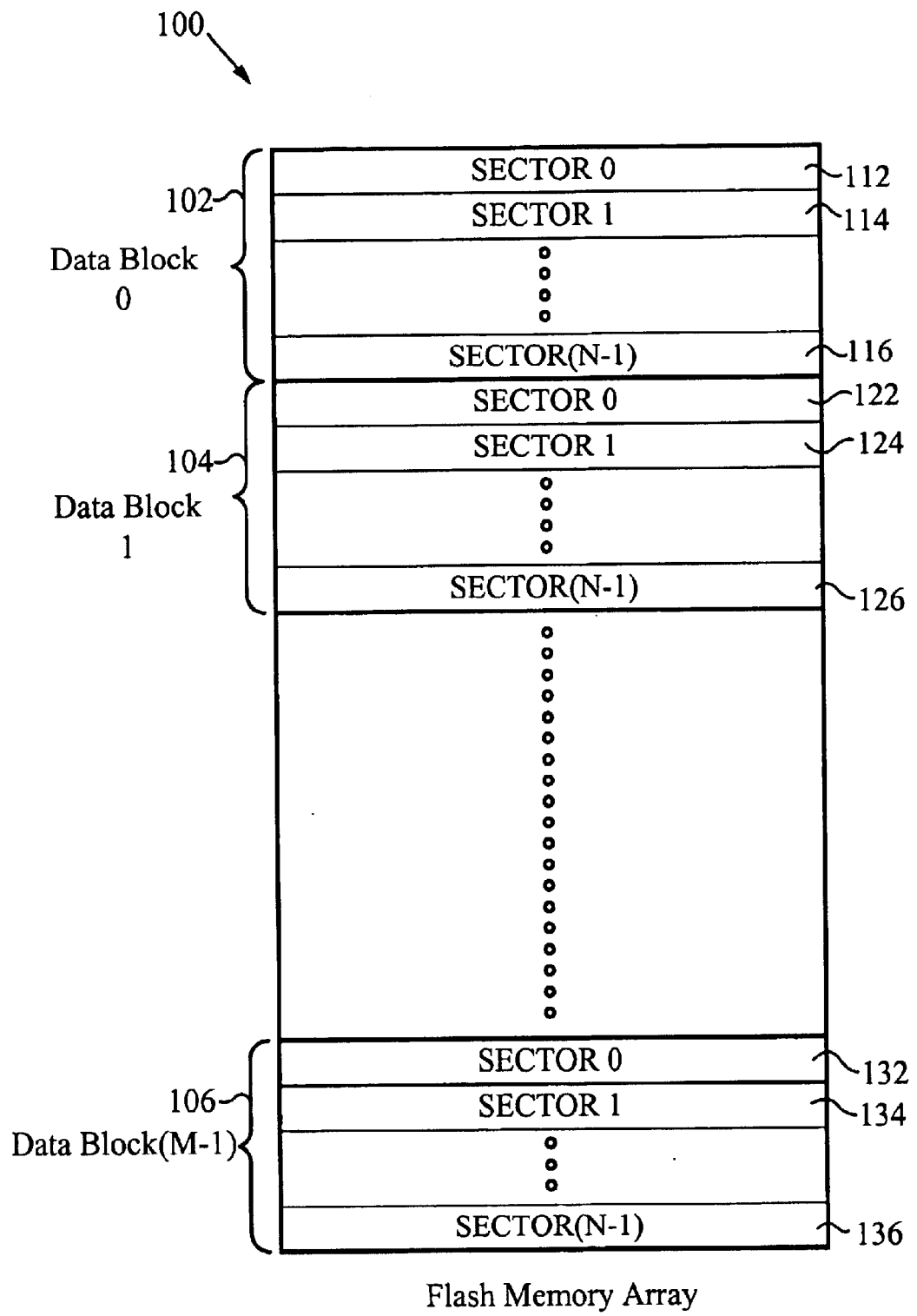
FIG. 1 illustrates an organization of a flash memory array in a typical flash memory system according to the prior art.
Figure 4:
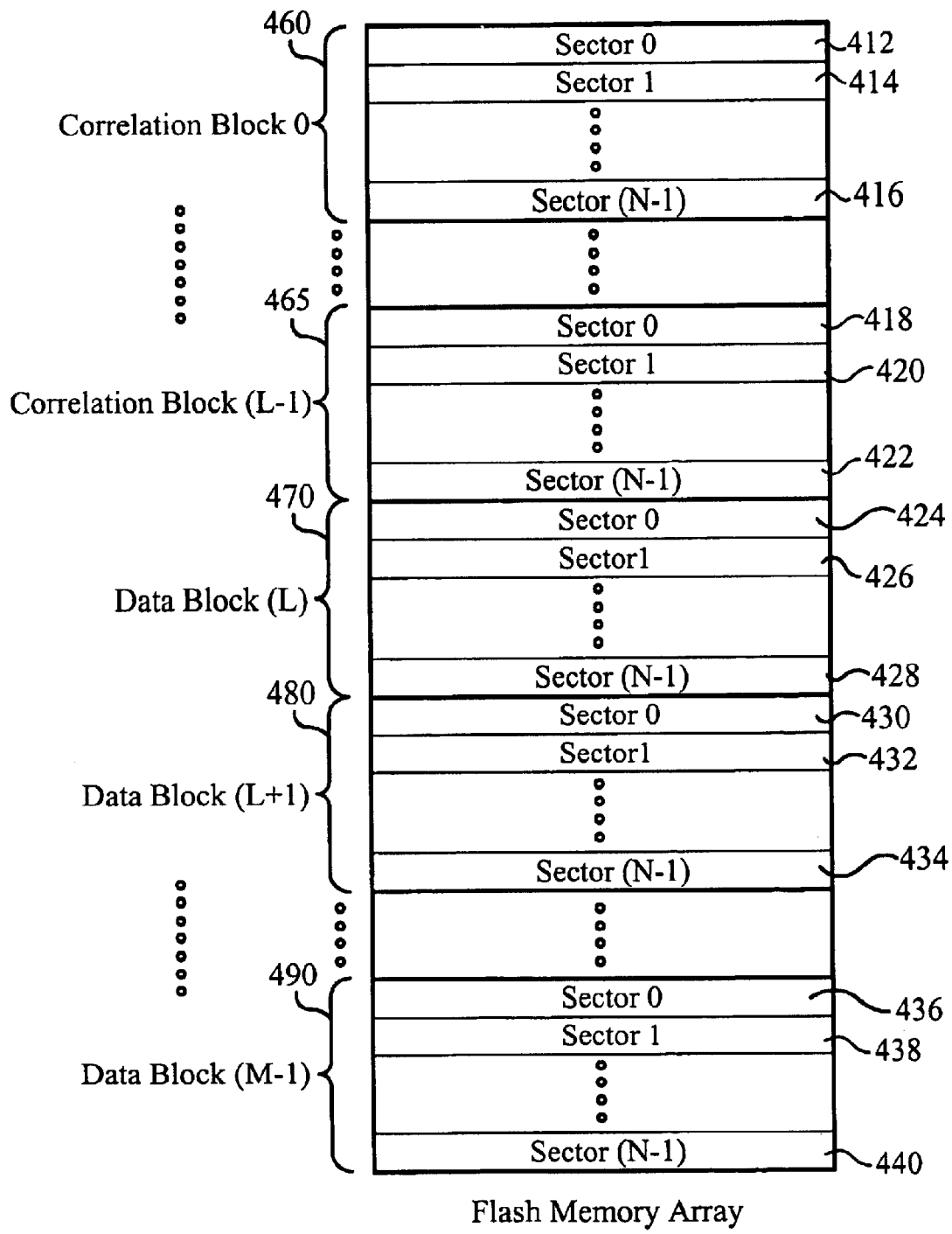
FIG. 4 illustrates an organization of a flash memory array in a flash memory system according to a first preferred embodiment of the present invention.

Each flash memory device comprises a flash memory array, the flash memory array including a plurality of flash memory cells. The flash memory cells are nonvolatile memory cells. The flash memory array represents the nonvolatile mass memory component described above. Refer to FIG. 4 for an illustration of an organization of the flash memory array 400 within the flash memory device of the flash memory system according to a first preferred embodiment of the present invention. Arranged similarly to the typical flash memory array of the prior art—see FIG. 1—, the flash memory array 400 of the present invention includes a plurality of blocks 460, . . . , 490 and a plurality of sectors 412, . . . , 440. In particular, the flash memory array 400 preferably includes at least one data block 470, . . . , 490 and at least one correlation block 460, . . . , 465. Each data block 470, . . . , 490 is configured to store the data received from the host digital system and is configured as described in the "Background of the Invention" and in FIGS. 1 and 2. In reality, each correlation block 460, . . . , 465 is in fact a block that is used to track VLBA-to-VPBA correlation. Each correlation block 460, . . . , 465 is configured to store the virtual physical block address (VPBA) assigned to the virtual logical block address (VLBA) received from the host digital system. Accordingly, each correlation block 460, . . . , 465 stores only the VPBAs assigned to the received VLBAs which are within a predetermined range of logical block addresses. In other words, the predetermined range of logical block addresses associated with each correlation block 460, . . . , 465 determines in which correlation block 460, . . . , 465 and in which sector 412, . . . , 422 within the correlation block 460, . . . , 465 the VPBA assigned to the received VLBA is stored. Preferably, each data block 470, . . . , 490 and each correlation block 460, . . . , 465 is selectively programmable and erasable.

The correlation blocks 460, . . . , 465 are labeled from zero to L−1, where L is the total number of correlation blocks 460, . . . , 465 in the flash memory device. Preferably, the flash memory device is designed to have a sufficient number of correlation blocks 460, . . . , 465 so that the VPBAs assigned to the VLBAs supported by the flash memory device can be stored in the flash memory device. As discussed in the "Background of the Invention", the configuration of each data block 470, . . . , 490 determines the total number of LBAs supported by the flash memory device.

However, the total number of LBAs supported by the flash memory system is obtained by summing the total number of LBAs supported by each flash memory device in the flash memory system.

As illustrated in FIG. 4, each correlation block 460, ..., 465 reduces an equivalent amount of addressable storage capacity from the flash memory device in the flash memory system. Hence, the data blocks 470, ..., 490 are labeled from L to M−1, where M is the total number of blocks 460, ..., 490 existing in the flash memory device before select blocks 460, ..., 465 were converted into correlation blocks 460, ..., 465, to reflect the fact that the addressable storage capacity supported by the flash memory system of the present invention is lower than the addressable storage capacity supported by the typical flash memory system of the prior art if both memory systems are configured with the same number of blocks in their memory arrays. However, this decrease in addressable storage capacity is minimal when compared to the total addressable storage capacity supported by the flash memory system.

Furthermore, each correlation block 460, ..., 465 includes a plurality of sectors 412, ..., 422. Within each correlation block 460, ..., 465, the sectors 412, ..., 422 are labeled from zero to N−1, where N is the number of sectors 412, ..., 422 within each correlation block 460, ..., 465. Additionally, each data block 470, ..., 490 includes a plurality of sectors 424, ..., 440. Within each data block 470, ..., 490, the sectors 424, ..., 440 are labeled from zero to N−1, where N is the number of sectors 424, ..., 440 within each data block 470, ..., 490. However, the sectors 412, ..., 422. in each correlation block 460, ..., 465 are not configured similarly to the sectors 424, ..., 440 in each data block 470, ..., 490, as will be described below. Since each sector 424, ..., 440 in each data block 470, ..., 490 supports one LBA, the total number of sectors 424, ..., 440 found in the data blocks 470, ..., 490 determines the total number of LBAs supported by the flash memory device.

FIG. 4 is merely intended to illustrate a particular arrangement of the correlation blocks 460, ..., 465, but is not meant to limit the arrangement of the correlation blocks 460, ..., 465 in the flash memory array 400 of the flash memory system to the particular arrangement disclosed. Other arrangements are possible. For example, the correlation blocks 460, ..., 465 can be distributed through out the flash memory array 400 rather than clustered together as shown in FIG. 4.

Figure 5:
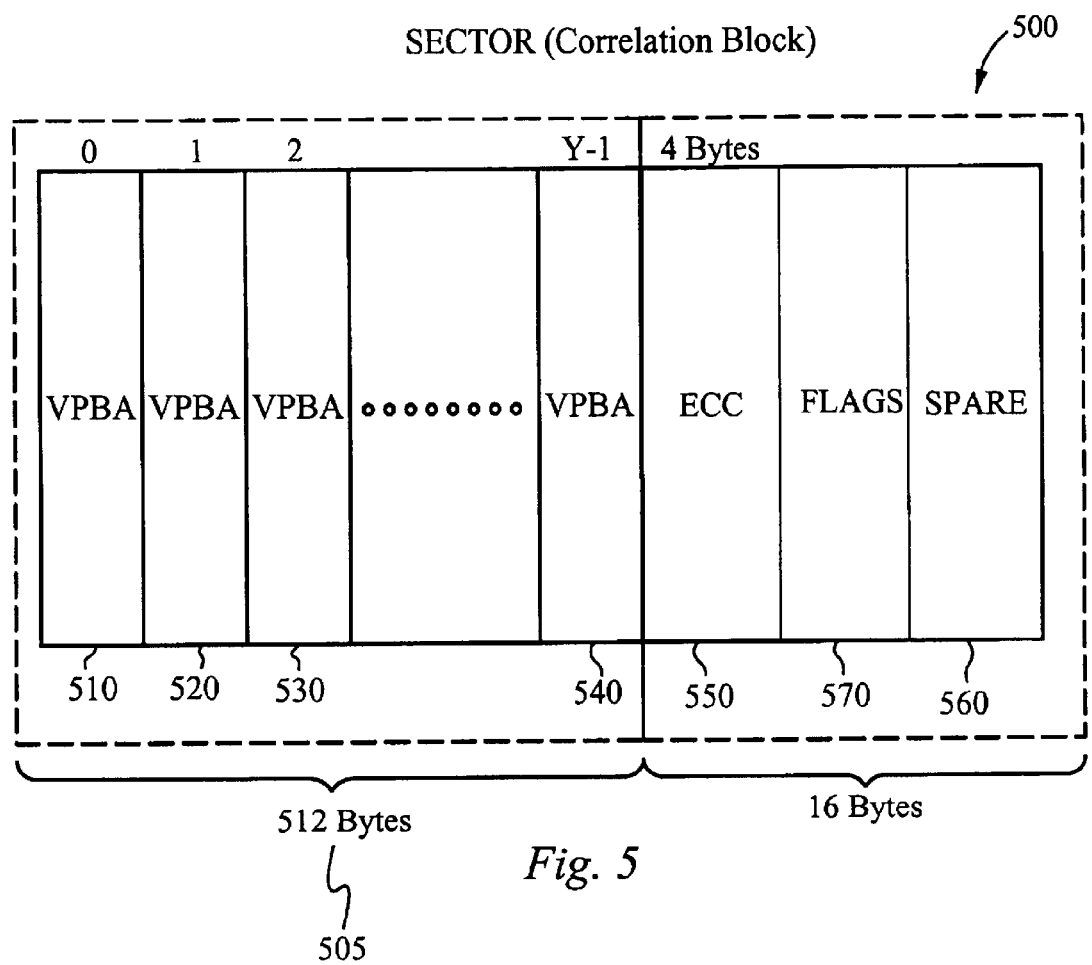
FIG. 5 illustrates a configuration of a sector of the correlation block in a flash memory system according to a first preferred embodiment of the present invention.

FIG. 5 illustrates the features of the sector 500 as configured in each correlation block. Preferably, the sector 500 includes a plurality of fields 510, ..., 560. In particular, a plurality of VPBA fields 510, ..., 540 are utilized for storing the VPBA assigned to the VLBA received from the host digital system. These VPBA fields 510, ..., 540 are functionally equivalent to the VPBA field 310 (FIG. 3) discussed in connection with the space manager 300 (FIG. 3) of the prior art. Preferably, the length of the VPBA fields 510, ..., 540 is configured in byte lengths (8 bits or multiples of 8 bits). Inasmuch as a VPBA field 510, ..., 540 must be large enough to store a Virtual Logical Block Address, the length of the VPBA is directly related to the addressable storage capacity supported by the flash memory system. Additionally, the total number of VPBA fields 510, ..., 540 included within each sector 500 is designed such that the total number of VPBA fields 510, ..., 540 occupies no more than an area 505 equivalent to the length of the DATA field 202 (FIG. 2) described in connection with the sector 200 (FIG. 2) of the prior art. The area 505 is preferably a length of five hundred twelve bytes, but can be configured to other lengths. Each VPBA field 510, ..., 540 is designated a predetermined VLBA representing a predetermined number of LBAs from the predetermined range of logical block addresses associated with the correlation block of which the sector 500 is a part. Hence, when the LBA is received from the host digital system and then transformed into the VPBA by the flash memory system, that VPBA is stored in the correlation block, specifically in the VPBA field 510, ..., 540 whose predetermined VLBA matches the received VLBA.

The sector 500 also includes an ECC field 550. The ECC field 550 is configured to store Error Correcting Code information associated with the area 505 containing the VPBA fields 510, ..., 540. Preferably, the ECC field 550 is a length of four bytes, which is sufficient to handle the Error Correcting Code information generated by an Error Correcting Code algorithm implemented in the flash memory system of the present invention. As will be apparent to those skilled in the art, other available Error Correcting Code algorithms could possibly necessitate the ECC field 550 to be configured to a different length. As noted in FIG. 3, the VPBA field 310 of the space manager 300 according to the prior art lacks ECC protection. Accordingly, ECC protection for the VPBA fields 510, ..., 540 is a unique advantage of the present invention which is particularly well suited for applications requiring a greater level of fault-free performance.

Additionally, the sector 500 includes a Flag field 570 containing a plurality of flags and a SPARE field 560 containing a plurality of spare bits which are utilized when needed.

FIG. 6 illustrates with greater detail the correlation blocks 660, ..., 675 of the flash memory array of the flash memory device in the flash memory system according to the first preferred embodiment of the present invention. To enhance understanding of the present invention, the position of the data blocks 680 relative to the correlation blocks 660, ..., 675 has been indicated but the discussion will focus and emphasize the configuration of the correlation blocks 660, ..., 675. For this example, four correlation blocks 660, ..., 675 were sufficient to keep track of the VLBA-to VPBA correlation for the flash memory system. Fields 610, ..., 630 correspond to the VPBA fields 510, ..., 540 of FIG. 5. ECC field 635 corresponds to the ECC field 550 of FIG. 5. Also, SPARE field 640 corresponds to the SPARE field 560 of FIG. 5.

Focusing on Correlation Block0 660 and on Correlation Block1 665, these correlation blocks 660 & 665 have the identical configuration, thus they are associated with the same predetermined range of logical block addresses (i.e., VLBA 0 to VLBA Y−1). The flash memory system is configured such that Correlation Block0 660 and Correlation Block1 665 are interdependent, i.e., physical block addresses are stored in either Correlation Block0 660 or Correlation Block1 665 depending on which correlation block has a free sector, i.e., a sector which has not been programmed or has been both programmed and erased, thus avoiding the erase-before-write cycle. Similarly, Correlation Block2 670 and Correlation Block3 675 have the identical configuration, thus they are configured with the same predetermined range of logical block addresses (i.e., VLBA Y to VLBA Z−1). The flash memory system is also configured such that Correlation Block2 670 and Correlation Block3 675 are interdependent, i.e., physical block addresses are stored in either Correlation Block2 670 or Correlation Block3 675 depending on which correlation block has the free sector, i.e., the sector which has not been programmed or has been both programmed and erased.

In these pairs of correlation blocks, one correlation block in each pair is referred as a primary correlation block 660 & 670 while the other correlation block in each pair is referred as an alternate correlation block 665 & 675. In the first preferred embodiment of the present invention, each primary correlation block 660 & 670 is preferably associated with at least one alternate correlation block 665 & 675. Eliminating the alternate correlation blocks 665 & 675 from the flash memory system increases the addressable storage capacity supported by the flash memory system. However, system performance would not be optimal because the flash memory system would be required to periodically perform an erase-before-write operation, i.e., perform an erase operation immediately before performing a write operation, on the primary correlation blocks 660 & 670, such erase-before-write operation degrades system performance for the reasons disclosed in the "Background of the Invention". Conversely, increasing the number of alternate correlation blocks 665 & 675 associated with each primary correlation block 660 & 670 decreases the addressable storage capacity supported by the flash memory system and is an effective solution to the wearing-out problem of the flash memory cells. Moreover, system performance would improve because the flash memory system would less frequently have to perform erase operations on the primary correlation blocks 660 & 670 and on the alternate correlation blocks 665 & 675, therefore reducing the possibility of needing to perform erase operations on the correlation blocks at in opportune instances. As is evident from this discussion, the present invention introduces design options for the flash memory system and allows compromises to be made within these design options in order to optimize the configuration of the flash memory system for any application under consideration.

Continuing with FIG. 6, Sector0 642 of Correlation Block0 660 illustrates the predetermined VLBAs, as described above, assigned to each VPBA field 610, . . . , 630. However, the predetermined VLBAs are not actually stored in each VPBA field 610, . . . , 630. In this example, the predetermined range of logical block addresses associated with Correlation Block0 660 extends from VLBA 0 to VLBA Y−1, where Y is the number of VLBAs assigned to the VPBA fields 610, . . . , 630 of Correlation Block0 660. Here, decimal number representations of the LBAs are used to simplify the understanding of the invention. Preferably, binary numbers will be used to practice the present invention. Since each data block 470, . . . , 490 (FIG. 4) includes N sectors—each sector supporting one LBA—, each VPBA will support N logical block addresses (LBAs), hence N predetermined LBAs are assigned to each VPBA field 610, . . . , 630 of Correlation Block0 660.

Figure 7:
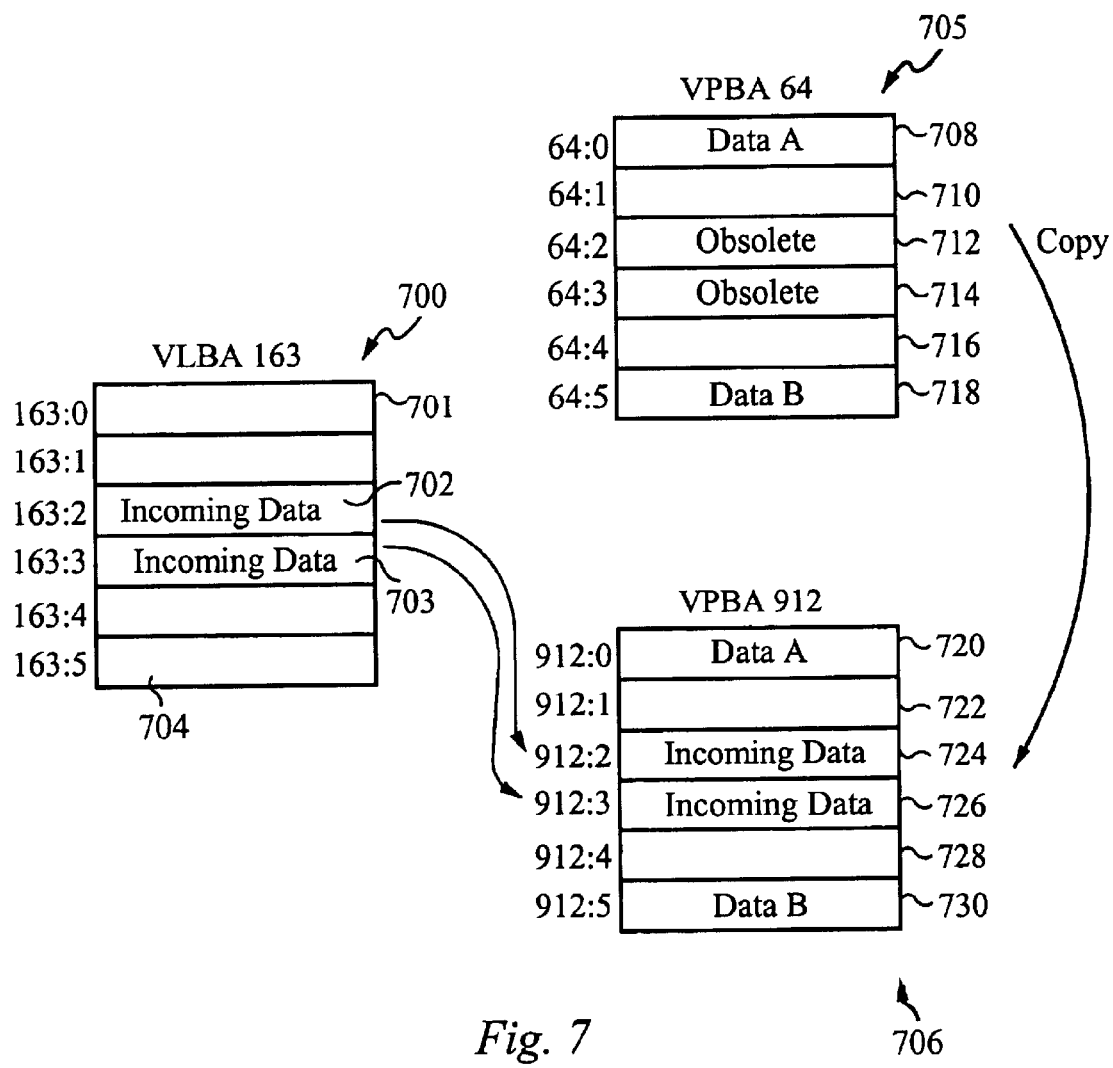
FIG. 7 illustrates the storage of incoming data in a new VPBA.

The operation of FIG. 6 can be illustrated in conjunction with a data storage event disclosed in FIG. 7. For ease of illustration only, VLBA 163 700 is comprised of only six LBA's 701, . . . , 704, and VPBA 64 705 and VPBA 912 706 are respectively only six sectors 708, . . . , 718 & 720, . . . , 730 in size. According to the preferred embodiment, the number of LBA's per VLBA is equal to the number of sectors (PBA's) per VPBA, as illustrated. Although there is no fixed number to limit the relation of PBA's to VPBA's (or LBA's to VLBA's), according to the preferred embodiment, each VPBA would be comprised of PBA's which, in number, were a power of two. More preferably, each VPBA would be comprised of sixteen or thirty two PBA's. Accordingly, the preferred embodiment would not typically disclose a VPBA comprised of six PBA's which is used for ease of illustration.

According to the illustration of FIG. 7, two LBA's 702, 703 of incoming data, both comprising the same VLBA 700 defined by VLBA 163 are received by the flash memory system. The previous data block 705 used to store VLBA 163 was defined as VPBA 64. It is noted that the first and last sector 708, 718 of that data block 705 store data, as well as the middle two sectors 712, 714 which are being rendered obsolete as a result of the incoming data in LBA's 702, 703. (It is recalled that, as a result of the concatenation process, incoming data in the third and fourth LBA's 702, 703 will be stored in the corresponding third and fourth sectors 724, 726 of the new data block 706, defined as VPBA 912. Accordingly, data stored in the third and fourth sectors 712, 714 of the previous data block 705 has become obsolete.) Accordingly, when copying data to a new data block 706 (VPBA 912), all of the sectors 708, . . . , 718 are typically copied into the corresponding sectors 720, . . . , 730 of the new data block 706, with the exception of those sectors 712, 714 being rendered obsolete by incoming data. Through this process, data from the non-obsolete sectors 708 and 718 of an obsolete data block 705 is copied into the new data block 706, maintaining the same respective sectors 720 and 730. According to this example, it is noted that incoming data may comprise any number of LBA's, from one, to all of the LBA's defining a VLBA.

As will be disclosed in greater detail in conjunction with FIG. 10, when user data defined by a given VLBA 700 is received from a host, to track the storage of the user data, the VPBA of the new data block 706 is stored in the current sector 642, . . . , 656 (FIG. 6) of the VPBA field 610, . . . , 630 which is correlated to the LBA that defined the incoming data. Because user data may consist of a single incoming LBA, the fields of FIG. 6 are displayed in terms of LBA's rather than VLBA's. For example, in sector zero 642 of the first column 610 of VPBA fields, the VPBA field is seen as correlated to LBA 0 through N−1. According to a preferred embodiment, a VLBA is comprised of N LBA's. According to this embodiment, each VPBA field could equally be depicted as being correlated to a single VLBA rather than a range of N LBA's, zero through N−1. However, because user data may be received in the form of a single LBA, which would equally initiate a data storage and correlation process, each VPBA field 610, . . . , 630 is conveniently illustrated as correlating to a range of N LBA's rather than a single VLBA. Because of this, the correlation relationships herein are variously referred to as an LBA-to-VPBA correlation, and a VLBA-to-VPBA correlation. Both are in fact true. As illustrated in FIG. 7, incoming data being correlated to a VPBA is defined by an LBA or series of LBA's, but the range of LBA's correlated to each VPBA field VPBA is equivalent to a VLBA.

Preferably, the predetermined LBAs are incrementally assigned to the VPBA fields 610, . . . , 630 in ascending order starting with VPBA field 610. However, the assignment of the predetermined LBAs can be implemented in other formats apparent to those skilled in the art. Additionally, Sector0 650 of Correlation Block2 670 illustrates additional predetermined LBAs assigned to each VPBA field 610, . . . , 630. In particular, the predetermined range of logical block addresses associated with Correlation Block2 670 extends from LBA Y to LBA Z−1. Preferably, within each correlation block 660, . . . , 675, Sector1 [643, 647, 651, and 655] through Sector(N−1) [644, 648, 652, and 656] are configured similarly to Sector0 [642, 646, 650, and 654].

FIG. 6 is merely intended to illustrate a particular configuration of the correlation blocks 660, . . . , 675 but is not meant to limit the configuration of the correlation blocks 660, . . . , 675 in the flash memory system to the particular configuration disclosed. Other configurations are possible.

Figure 2:
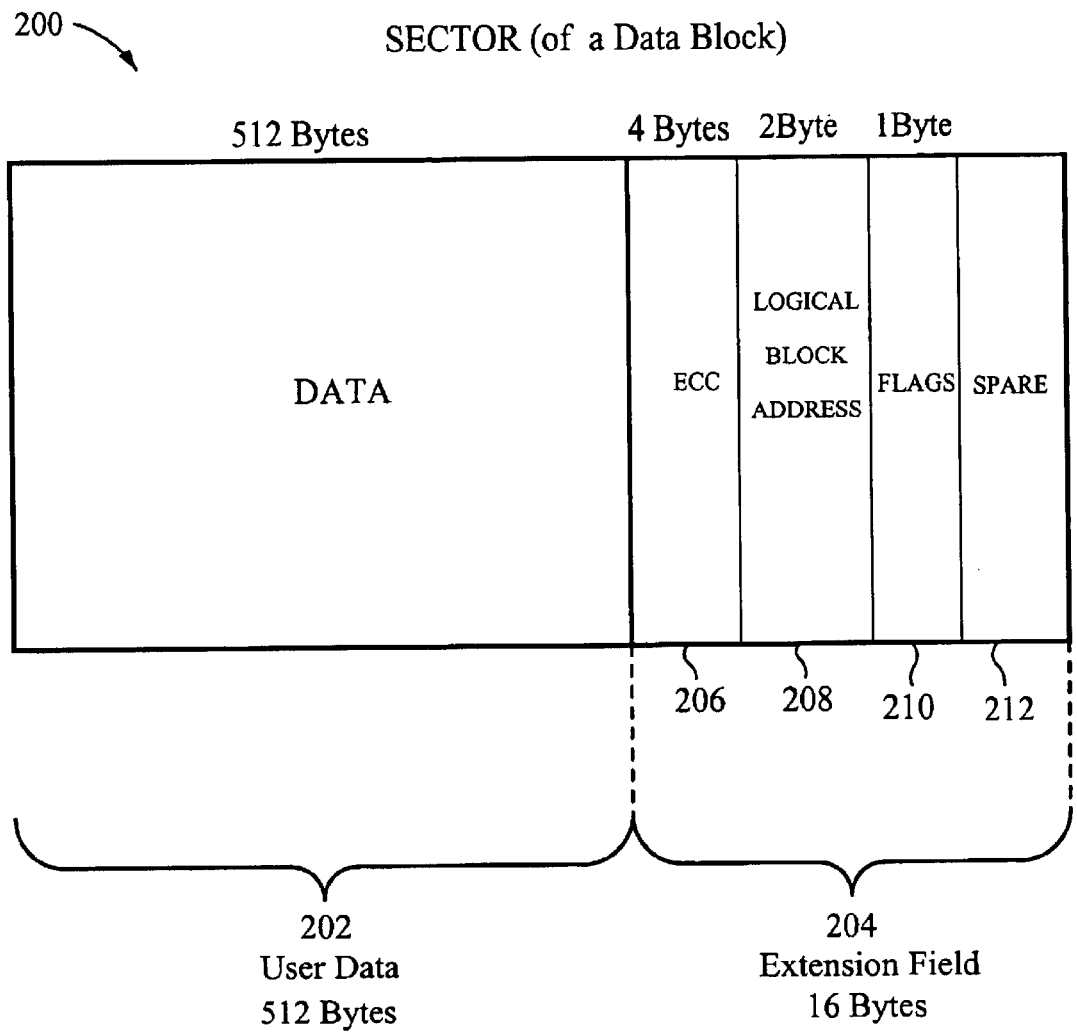
FIG. 2 illustrates a configuration of a sector in a typical flash memory system according to the prior art.
Figure 8:
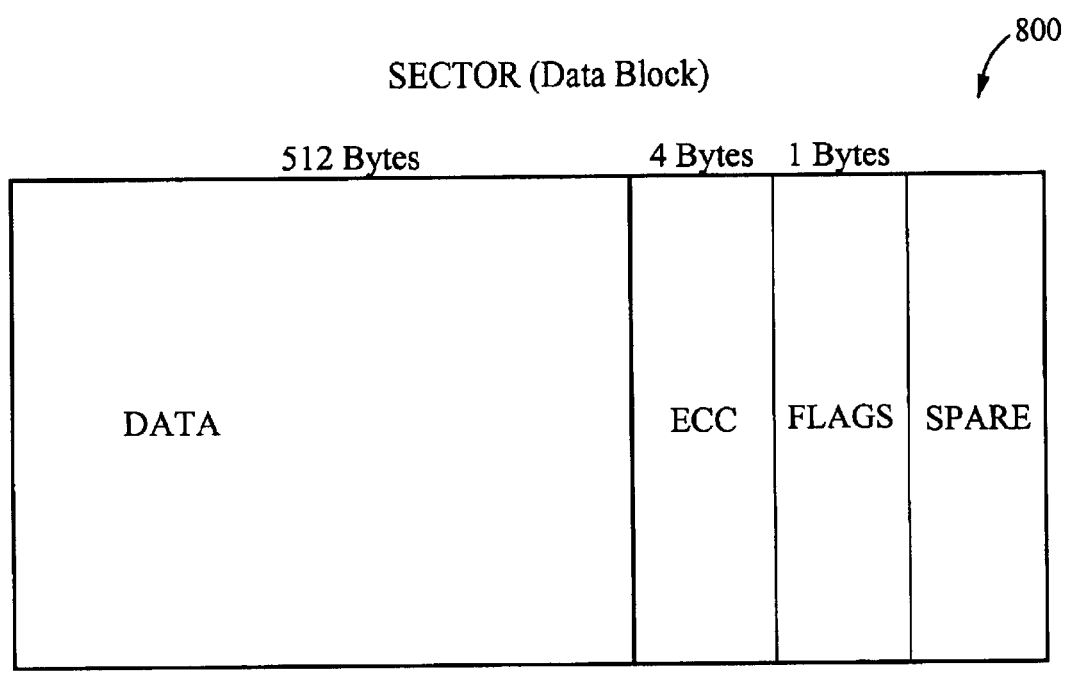
FIG. 8 illustrates a configuration of a sector of a data block in a flash memory system according to a first preferred embodiment of the present invention.

Since the LBAs are uniquely assigned to the VPBA fields 510, . . . , 540 (FIG. 5) in the correlation block 660, . . . , 675 (FIG. 6), it is unnecessary to store the LBAs in the LOGICAL BLOCK ADDRESS field 208 (FIG. 2) in the data blocks 470, . . . , 490 (FIG. 4), as is done in the prior art. As discussed in the "Background of the Invention", the space manager 300 (FIG. 3) of the prior art loses its contents when power is turned off, hence the LOGICAL BLOCK ADDRESS field 208 (FIG. 2) does not serve as a back-up for restoring information originally stored in the space manager 300 (FIG. 3) after the loss of power. FIG. 8 illustrates an alternative configuration for the sectors 424, . . . , 440 (FIG. 4) in the data blocks 470, . . . , 490 (FIG. 4). When compared to the configuration in FIG. 2, the configuration in FIG. 8 is similar except for not having the LOGICAL BLOCK ADDRESS field 208 (FIG. 2). This configuration conserves memory space in the flash memory system of the present invention.

Figure 3:
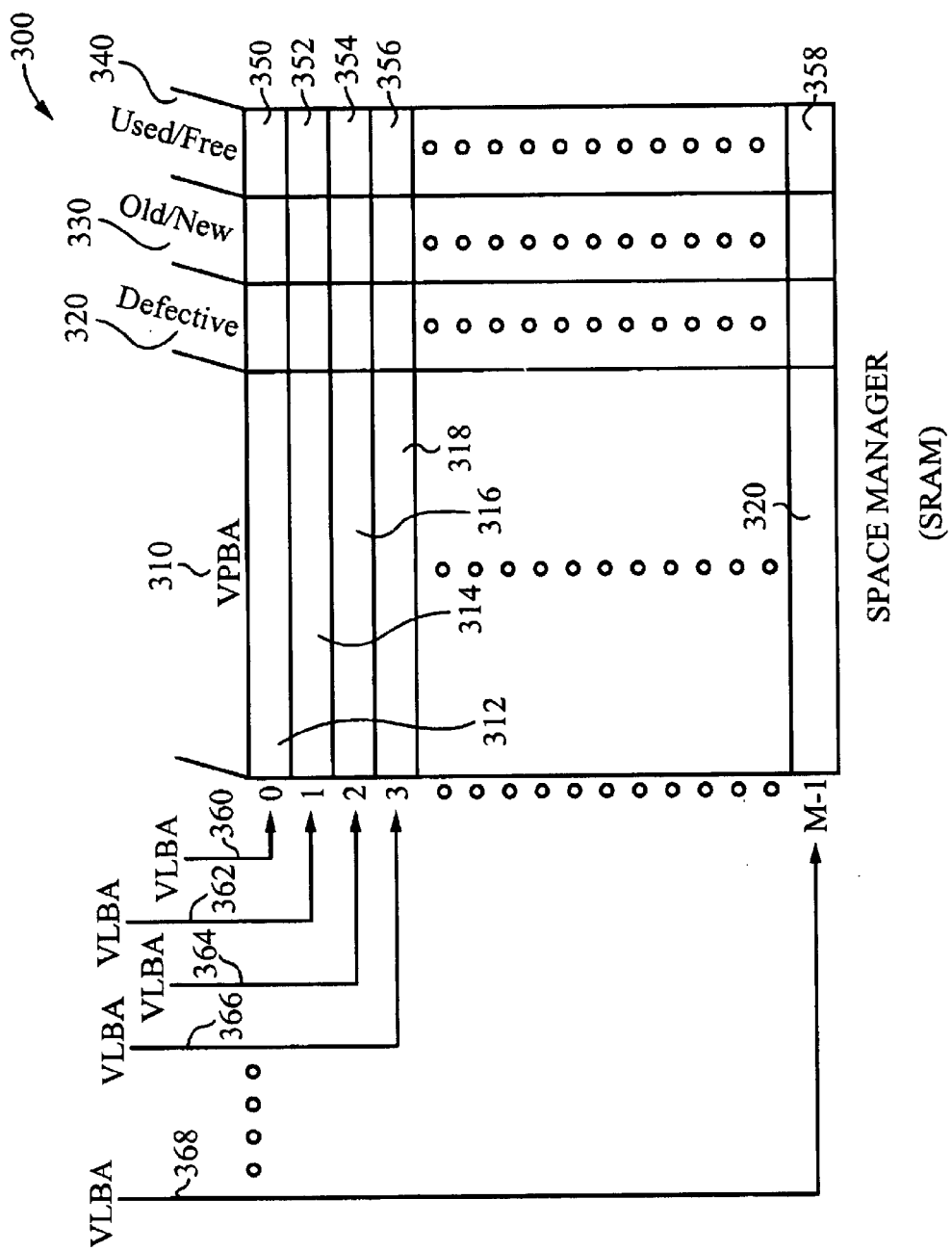
FIG. 3 illustrates a configuration of a space manager in a typical flash memory system according to the prior art.

As described earlier, the flash memory system preferably includes a controller coupled to each flash memory device. The controller includes logic circuitry to control and to manage the read operation, the write operation, and the erase operation. Additionally, the controller is configured to control the configuration of the data blocks 470, . . . , 490 (FIG. 4) and the configuration of the correlation blocks 460, . . . , 465 (FIG. 4). In particular, the controller can adjust the length of each VPBA field 510, . . . , 540 (FIG. 5) and can configure the necessary correlation blocks 460, . . . , 465 (FIG. 4) to support the addressable memory capacity for an appropriate configuration of the flash memory system, thus expanding the utility of the controller, unlike the prior art where utility of the controller was limited by the capacity of the space manager 300 (FIG. 3). Moreover, the controller is configured to write and to read the correlation information in correlation blocks 460, . . . , 465 (FIG. 4) and is configured to write and to read the data received from the host digital system in the data blocks 470, . . . , 490 (FIG. 4).

Figure 9:
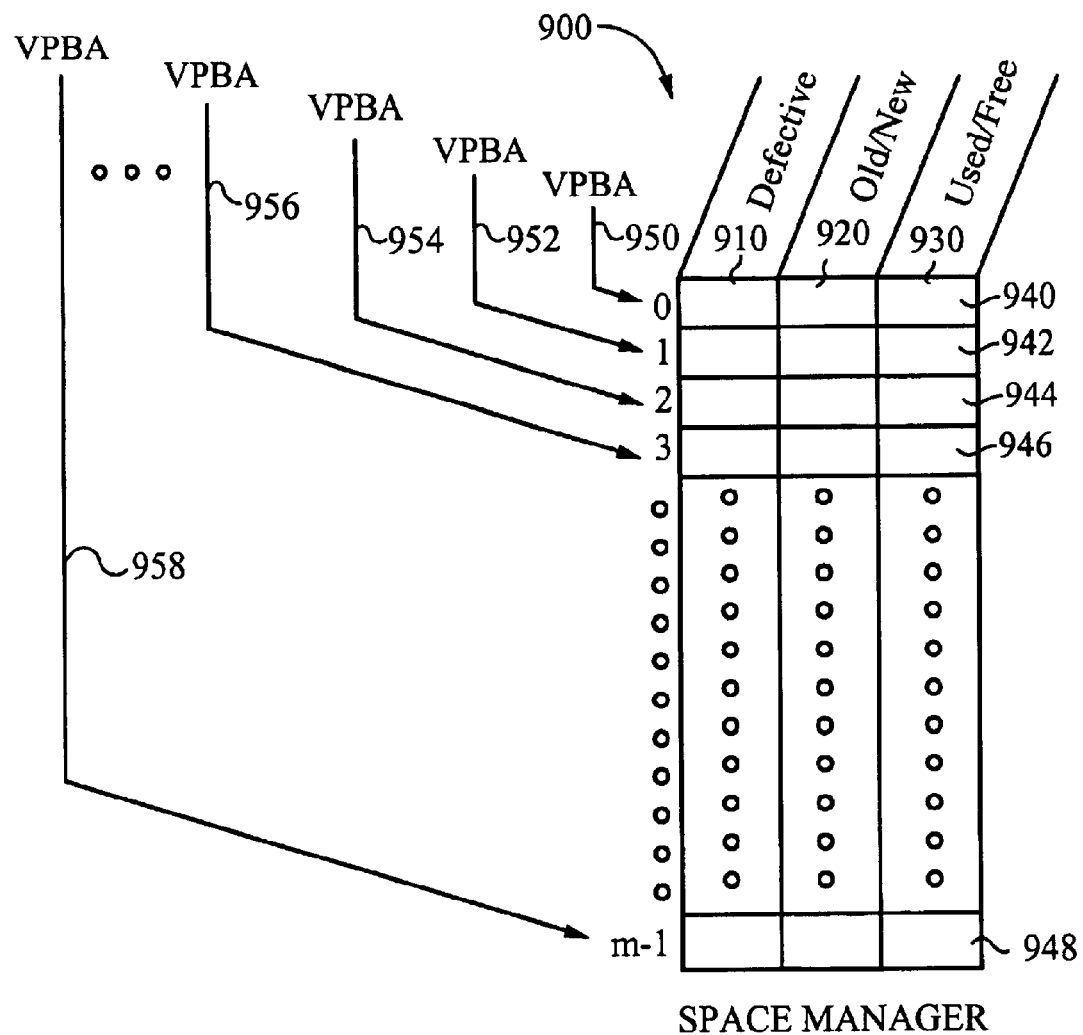
FIG. 9 illustrates a configuration of a new space manager in a flash memory system according to a first preferred embodiment of the present invention.

Preferably, the controller includes a new space manager. FIG. 9 illustrates the configuration of the new space manager 900. The new space manager 900 keeps track of the flags associated with the data blocks 470, . . . , 490 (FIG. 4) and the correlation blocks 460, . . . , 465 (FIG. 4) in the manner discussed in the "Background of the Invention". The new space manager 900 represents the volatile specialized memory component described above. The new space manager 900 preferably comprises a new volatile RAM array, the new volatile RAM array preferably including SRAM memory cells. The new space manager 900 includes a plurality of volatile addressable memory locations 940, . . . , 948. Each volatile addressable memory location 940, . . . , 948 corresponds to one of the blocks 460, . . . , 490 (FIG. 4), including both data blocks 470, . . . , 490 and correlation blocks 460, . . . , 465 (FIG. 4). Status information concerning each of these blocks 460, . . . , 490 is stored in the space manager 900. Assuming the flash memory system includes only one flash memory device as described in conjunction with FIG. 4, the new space manager 900 will include m−1 volatile addressable memory locations 940, . . . , 948, preferably equal to the number of VPBAs 950, . . . , 958 of the flash memory system. Additionally, each volatile addressable memory location 940, . . . , 948 includes a plurality of fields 910, . . . , 930. These fields include the defective block flag 910, the old/new (obsolete) block flag 920, and the used/free block flag 930, as identified in the "Background of the Invention". Since the new space manager 900 does not include the VPBA field 310 (FIG. 3) as in the space manager 300 (FIG. 3) of the prior art, there is a marked reduction in logic circuitry space requirement for the new space manager 900 in the controller when compared to the logic circuitry space requirement for the space manager 300 (FIG. 3) of the prior art.

As shown in FIG. 6, each correlation block 660, . . . , 675 includes sectors 642, . . . , 656 which are configured to store the VPBAs assigned to the LBAs within the predetermined range of logical block addresses associated with each correlation block 660, . . . , 675. In light of this, the flash memory system includes components to facilitate the tracking of the ( VLBA-to-PBA) correlation within each correlation block 660, . . . , 675. Rather than reading each sector 642, . . . , 656 in each correlation block 660, . . . , 675 to determine a current sector before writing the correlation information in each correlation block 660, . . . , 675, the controller preferably includes means for storing a designation identifying the current sector for each predetermined range of logical block addresses, means for generating the designation, and means for decoding the designation. Each current sector stores current correlation information, i.e., current VLBA-to-VPBA relations for a predetermined range of logical block addresses. Thus, each predetermined range of logical block addresses is associated with one current sector. Since each designation uniquely identifies the current sector for each predetermined range of logical block addresses, the number of correlation blocks 660, . . . , 675 associated with each predetermined range of logical block addresses as well as the number of sectors 642, . . . , 656 in each correlation block 660, . . . , 675 determine the length of the designation. As an example, assuming two correlation blocks are associated with a predetermined range of logical block addresses and each correlation block has sixteen sectors, the designation would have to be capable of uniquely identifying thirty-two sectors because any one of the thirty-two sectors could be the current sector. For this example, a length of one byte would be sufficient to enable the designation to uniquely identify any one of the thirty-two sectors. The designation can be implemented as any appropriate implementation known to those skilled in the art.

Figure 10A:
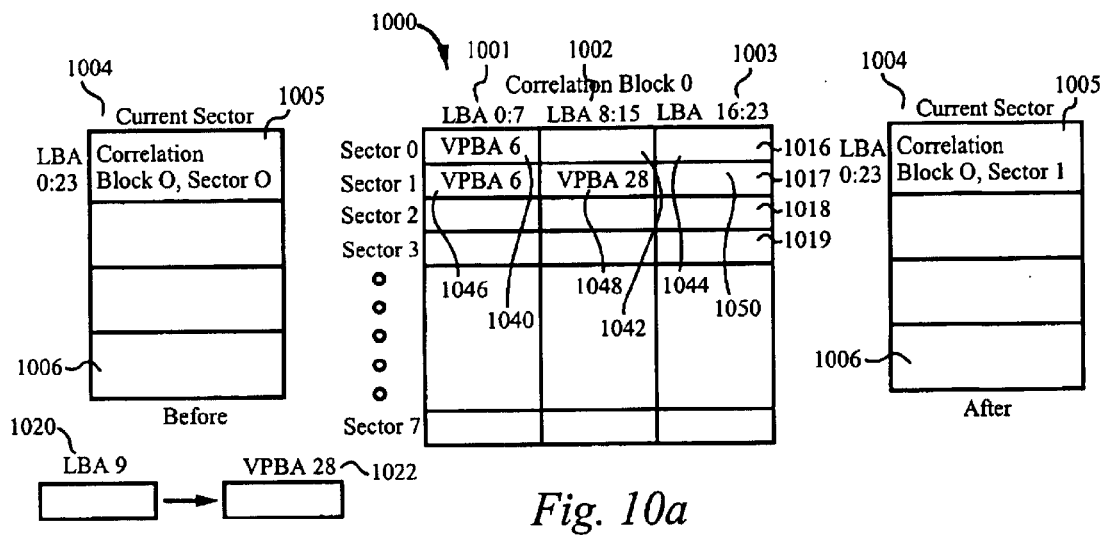
FIGS. 10A through 10C illustrate a sequence of operations performed, on a correlation block and on a volatile RAM array responsible for storing designations identifying current sectors, by a flash memory system according to a first preferred embodiment of the present invention.
Figure 10B:
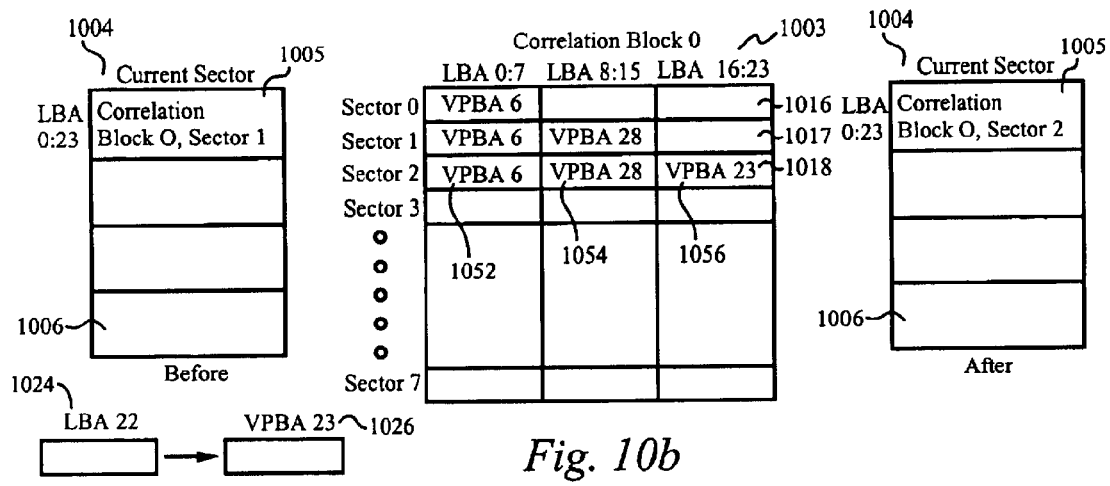
Figure 10C:
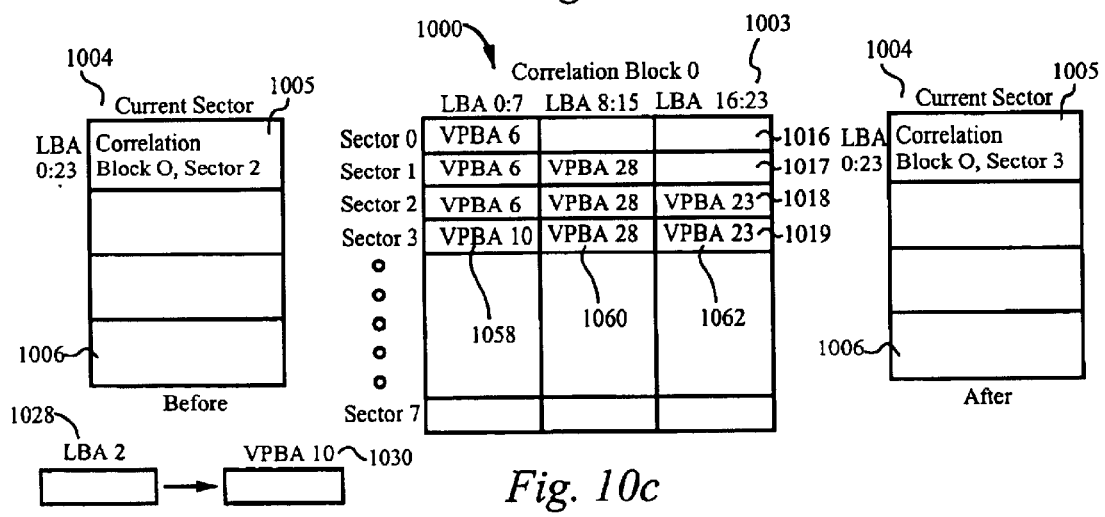

The means for storing the designation is preferably implemented as a volatile RAM array or an equivalent discussed in greater detail in conjunction with element 1004 (FIGS. 10*a*–10*c*). Preferably, the volatile RAM. array comprises SRAM memory cells. Alternatively, the volatile RAM array can comprise other types of RAM memory cells known to those skilled in the art. The volatile RAM array includes a plurality of addressable volatile memory locations. Each addressable volatile memory location corresponds with one of the predetermined ranges of logical block addresses associated with the correlation blocks 660, . . . , 675. Each addressable volatile memory location stores the designation identifying the current sector associated with the predetermined range of logical block addresses corresponding with the addressable volatile memory location. Preferably, the volatile RAM array includes a sufficient number of volatile memory locations to enable the controller to function in a wide range of memory configurations for the flash memory system. The logic circuitry space occupied by the volatile RAM array in the controller is substantially less than the logic circuitry space occupied by the VPBA field 310 (FIG. 3) of the space manager 300 (FIG. 3) of the prior art because the volatile RAM array contains addressable volatile memory locations that are fewer in number and smaller in length than the VPBA field 310 (FIG. 3) of the space manager 300 (FIG. 3) of the prior art. Finally, during a power-up and during a system reset, the flash memory system restores the contents of the volatile RAM array by reading each sector 642, ..., 656 in each correlation block 660, ..., 675 to determine the current sector associated with each predetermined range of logical block addresses and then generating each designation to be stored in the volatile RAM array.

The means for generating the designation generates the designation to be stored in the volatile RAM array. The means for decoding the designation decodes the designation stored in the volatile RAM array. The flash memory system uses the decoded designation to choose an appropriate sector in which to store correlation information relating to the LBA received from the host digital system.

As discussed in the "Background of the Invention", a block having a set defective block flag is not utilized by the typical flash memory system. Similarly, the flash memory system of the present invention does not utilize a data block or a correlation block having a set defective block flag. According to the preferred embodiment, when a correlation block becomes defective, the controller will reconfigure and reassign an unused and non-defective data block to take the place of the defective correlation block.

In practice, the process of keeping track of the VLBA-to-VPBA correlation in the correlation blocks is dependent on the configuration chosen for the flash memory system, i.e., the number of alternate correlation blocks associated with each primary correlation block. This design choice determines the system performance.

Fundamentally, all the configurations available for the flash memory system share the following process of keeping track of the LBA to PBA correlation in the correlation blocks. The flash memory system receives data defined according to an LBA from the host digital system. The flash memory system selects an appropriate data block in which to store the received data. The specific sector for storing a VLBA of incoming user data is designated by concatenating the lower order bits of the VLBA onto the VPBA, thereby defining the PBA of the sector designated for storage. By maintaining a unique correlation of lower order bits between a PBA and an LBA in this manner, a Correlation Block need only correlate VLBA's to VPBA's. The VPBA of the appropriate data block is correlated with the received LBA by storing the VPBA in an appropriate correlation block associated with the predetermined range of logical block addresses encompassing the received LBA, unlike the prior art where the VPBA of the appropriate data block is stored in an appropriate volatile addressable memory location in the space manager 300 (FIG. 3). Within the appropriate correlation block, the VPBA is stored in the VPBA field whose predetermined LBA matches the received LBA.

Before the VPBA is stored in the appropriate correlation block, the flash memory system decodes, from the volatile RAM array, the designation identifying the current sector associated with the predetermined range of logical block addresses encompassing the received LBA. The flash memory systemutilizes this current sector information to determine and to locate the free sector, i.e., the sector which has not been programmed or has been both programmed and erased, in the appropriate correlation block. Preferably, the flash memory system fills in sequential order the sectors within the appropriate correlation block. As illustrated in conjunction with FIGS. 10a–10c, the flash memory system programs the unchanged correlation information, i.e., LBA to PBA relations unaffected by the received LBA, from the current sector into the free sector simultaneously with programming the new VPBA into the free sector, thus the flash memory system avoids the erase-before-write operation which would be required if the flash memory system programmed the new correlation information, into the current sector. Finally, the flash memory system generates an updated designation identifying the current sector and stores the updated designation in an appropriate location in the volatile RAM array.

This process of tracking the LBA to VPBA correlation allows the flash memory system to store the data defined according to a plurality of LBAs in several data blocks and to update rapidly the correlation information relating to the LBAs in the correlations blocks after programming all the data in the data blocks, rather than updating the correlation information relating to each LBA after the data associated with each LBA is stored in the data blocks, thus increasing system performance.

The flash memory system of the present invention must write to the flash memory device at least twice in order to complete the write operation since the flash memory system must program the data in the data blocks and program the correlation information in the correlation blocks. The flash memory system preferably maintains system performance by programming the correlation information into the correlation blocks in the background, i.e., while performing another operation, or during periods of system inactivity, i.e., when no other operation is being performed, as much as possible. For example, after the flash memory system has programmed the data into the flash memory device and while communicating to the host digital system that the flash memory system is ready to process additional data, the flash memory system can program the correlation information into the correlation blocks in the flash memory device.

When performing the read operation, the flash memory system of the present invention is able to retrieve user data by means of the information within the correlation blocks which relate LBA's or VLBA's to a VPBA where the data is stored. The Flash Memory. System accesses the data block of the designated VPBA and retrieves the requested data. When the requested data is sent to the host, it is defined according to the LBA or LBA's which had been requested by the host.

A correlation block is filled when there is no free sector available. If the correlation block does not have an alternate correlation block, the flash memory system must perform the erase-before-write operation on the filled correlation block. This procedure will increase the wearing-out rate of the filled correlation block and degrade system performance.

According to the preferred embodiment, however, the flash memory system will begin writing correlation data in an alternate correlation block, preferably beginning with the first sector. While filling the alternate correlation block, the flash memory system will erase the filled correlation block so that an erased correlation block is available when the alternate correlation block is filled. Similarly, a filled alternate correlation block will be erased before the correlation block is filled. This procedure avoids performing the erase-before-write operation, thus improving system performance.

Lastly, if the correlation block has more than one alternate correlation block, the flash memory system proceeds as described above. However, since more than one alternate correlation block exists, the flash memory system is able to distribute the usage of the correlation block and alternate correlation blocks so as to minimize wearing-out of any one of the alternate correlation blocks and the correlation block. For example, once a first alternate correlation block is filled, the flash memory system can proceed to fill a second alternate correlation block rather than erasing the filled correlation block. There are many variations to this algorithm. All of these variations are part of the present invention. In addition, performing erase operations on the correlation block-and on each alternate correlation block is less frequently needed, conserving system resources and improving system performance.

The flash memory system employs the new space manager 900 (FIG. 9) including a flag field with flags indicating if a block is defective 910, old (obsolete) 920 or used 930. These flags 910, 920, 930 are useful in directing the controller in the performance of the erase operation. If a block is flagged as "old" (obsolete data), but not flagged as defective, it is targeted for erasure. As noted, the erase operation is preferably conducted as a "background" process so as not to interrupt or slow user operation.

In FIG. 10A, prior to the first event, Sector 0 1016 of Correlation Block 0 1000 stores the physical address VPBA 6 in a VPBA field 1040 correlated to a predetermined LBA range (LBA 0 through LBA 7) 1001, indicating that data correlated to at least one LBA address in that predetermined range 1001 is currently stored in VPBA 6. According to the preferred embodiment of the present invention, a volatile RAM array 1004 is comprised of a variety of registers 1005, 1006. Each register 1005, 1006 is dedicated to a different predetermined range of LBA's. The first register 1005 is assigned to LBA range (LBA 0–LBA 23), which is currently being tracked by Correlation Block 0 1000. The range of twenty-four LBA's tracked per Correlation Block is exemplary, and not intended to limit the present invention to any particular range. Although the invention is applicable to any range of LBA's per correlation block, according to one embodiment, a correlation sector 500 (FIG. 5) would comprise five hundred twelve usable bytes 505, each VPBA field comprising two bytes, resulting in two hundred fifty-six VPBA fields 1040, . . . , 1062 per sector 1016, . . . , 1019 (FIGS. 10a–10c). If each of two hundred fifty-six fields supported one VLBA comprised of sixteen LBA's, the range of LBA's in a Correlation Block would be four thousand ninety six. Again, these figures are not intended to limit the present invention, but to illustrate a typical size of LBA fields envisioned according to the present invention.

Returning to FIG. 10A, in the first event, incoming data 1020 defined as LBA 9 is stored in VPBA 28 1022. In order to track the location for future retrieval, the correlation between LBA and VPBA must be recorded. The first register 1005 of the volatile RAM array 1004 indicates that the current sector for storing correlation data relating to LBA range zero through 23 was Correlation Block 0 1000, Sector 0 1016. If data retrieval were the issue, the controller would access the current sector 1016. However, for the process of data storage and the concomitant storage of correlation data, the controller increments to the next sector, which is sector one 1017. Because the incoming data 1020 was defined as LBA 9, it falls in the predetermined range (LBA, 8 to LBA 15) 1002. Accordingly, the physical address "VPBA 28" of the newly received data is stored in the appropriate VPBA field 1048 of the new sector 1017. All correlation data from the previous sector 1016 also remains valid unless overwritten. Accordingly, the address "VPBA 6" recorded in the first VPBA field 1040 of Sector 0 1016 is written in the same respective VPBA field 1046 of the new sector 1017. Finally, the first field 1005 of the volatile RAM array 1004, which identifies the current sector for correlation data to LBA range (LBA 0 through LBA 23), is updated, indicating that correlation data is now located in correlation block 0, Sector 1.

The same basic process is seen to repeat itself in FIG. 10B, when incoming data 1024 defined by LBA 22 is stored in VPBA 23 1026. The first register 1005 of the volatile RAM array 1004 indicates "Block 0, Sector 1" prior to the storage of incoming data. As the incoming data 1024 is stored in VPBA 23 1026, the controller increments to the next sector 1018. To facilitate retrieval of the newly stored data, correlation data is stored in the appropriate VPBA field. LBA 22, which defined the incoming data 1024, falls in the predetermined range of (LBA 16–LBA 23) 1003. Accordingly, the new physical address VPBA 23 is stored in a VPBA field 1052 corresponding to the predetermined LBA range 1003 in the new sector 1018. Again, current correlation data from the previous sector 1017 stored in VPBA fields 1046, 1048 which are not being updated are copied into corresponding VPBA fields 1052, 1054 of the new sector 1018. The corresponding register 1005 of the volatile RAM array 1004 is seen to have been updated following the storage of correlation data in the new sector.

The process is again repeated in FIG. 10C, when incoming data 1028 defined by LBA 2 is stored in VPBA 10 1030. The first register 1005 of the volatile RAM array 1004 indicates "Block 0, Sector 2" prior to the storage of incoming data. As the incoming data 1028 is stored in VPBA 10 1030, the controller increments to the next sector 1019. To facilitate retrieval of the newly stored data, correlation data is stored in the appropriate VPBA field. LBA 2, which defined the incoming data 1028, falls in the predetermined range of (LBA 0–LBA 7) 1001. Accordingly, the new physical address VPBA 10 is stored in a VPBA field 1058 corresponding to the predetermined LBA range 1001 in the new sector 1019. Again, current correlation data from the previous sector 1018 stored in VPBA fields 1054, 1056 which are not being updated are copied into corresponding VPBA fields 1060, 1062 of the new sector 1019. The corresponding register 1005 of the volatile RAM array 1004 is seen to have been updated following the storage of correlation data in the new sector.

Figure 11:
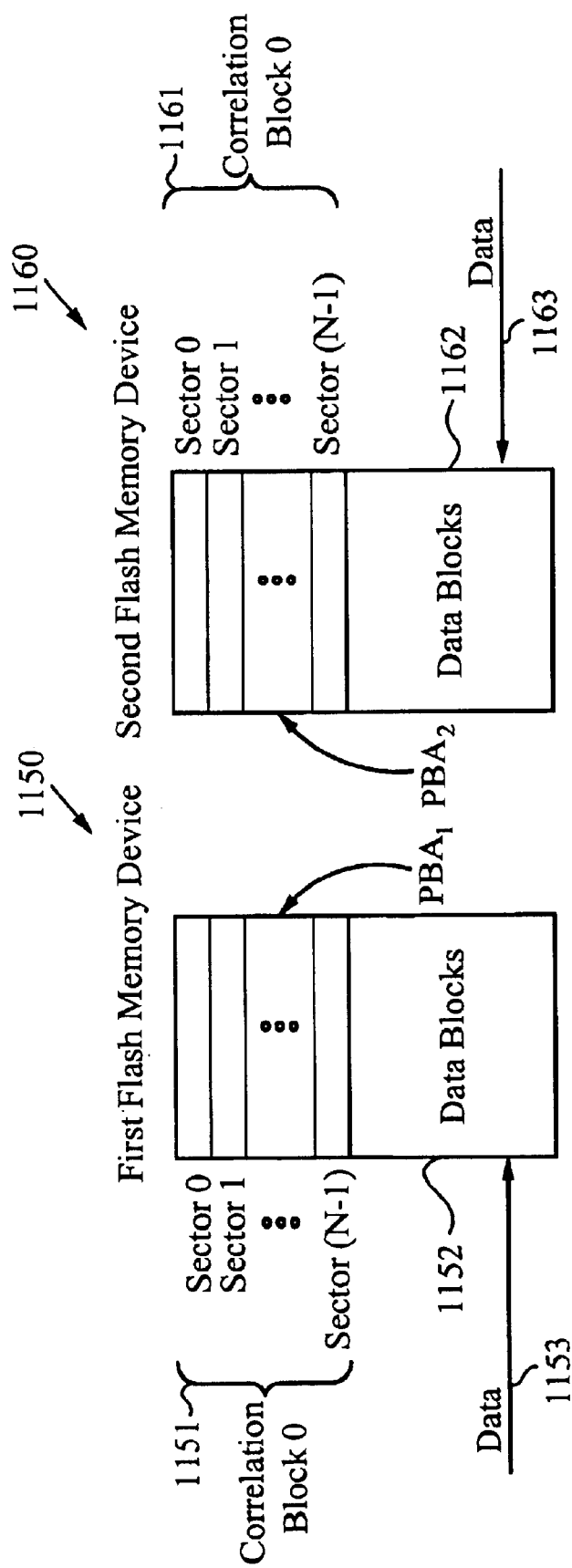
FIG. 11 illustrates a configuration of a first flash memory device and a second flash memory device in a flash memory system according to a first preferred embodiment of the present invention.

If the flash memory system of the present invention includes more than one flash memory device, the process of keeping track of the (LBA to PBA) correlation in the correlation blocks can be modified to improve system performance. FIG. 11 illustrates a configuration of a first flash memory device 1150 and a second flash memory device 1160 in a flash memory system according to a first preferred embodiment of the present invention. According to this embodiment, the flash memory system programs the correlation information PBA1 relating to the data 1153 into the correlation block 1151 of the first flash memory device 1150 and programing the data 1153 into the data blocks 1152 of the first flash memory device 1150. Similarly, the flash memory system programs the correlation information PBA2 relating to the data 1163 into the correlation block 1161 of the second flash memory system 1160 and programs the data 1163, into the data blocks 1162 of the second flash memory system.

However, system performance is enhanced by keeping track of the correlation between the LBAs and the PBAs of the data 1153 stored in the first flash memory device 1150 in the correlation block 1161 of the second flash memory device 1160 while keeping track of the correlation between the LBAs and the PBAs of the data 1163 stored in the second flash memory device 1160 in the correlation block 1151 of the first flash memory device 1150. This technique maximizes system performance because the data and the correlation information can be programmed concurrently.

Figure 12:
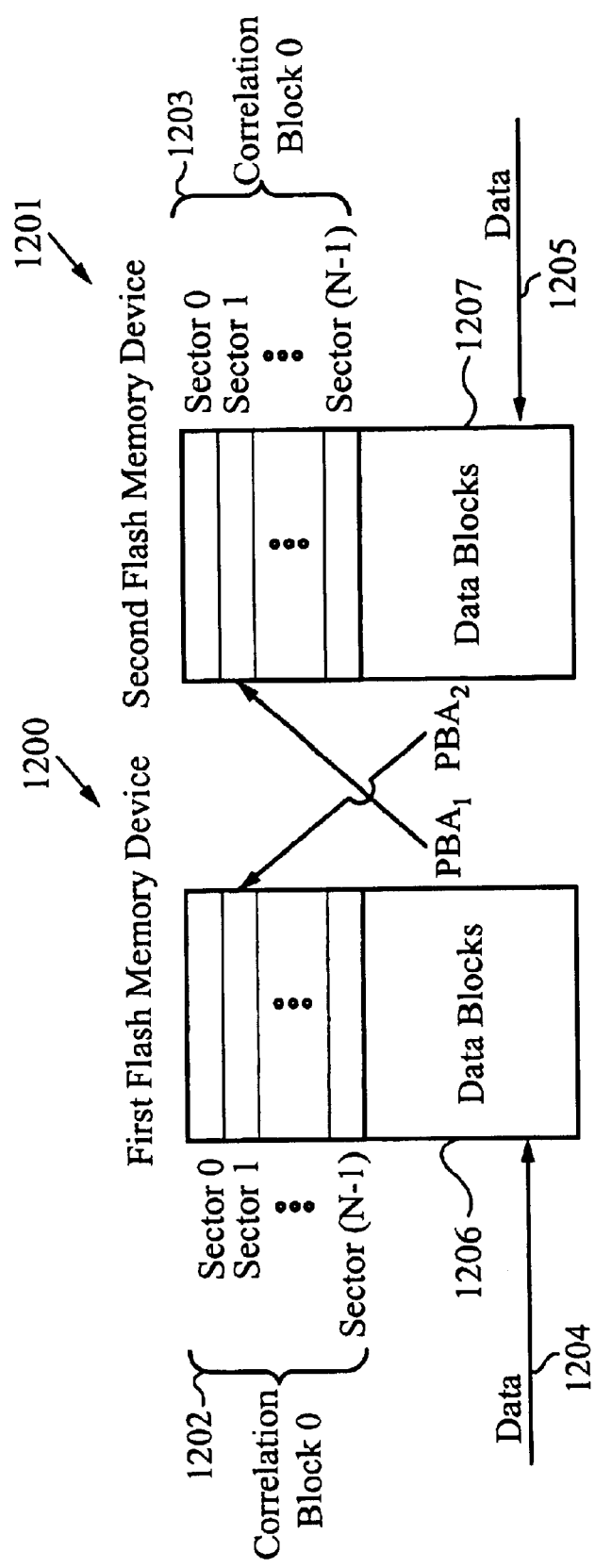
FIG. 12 illustrates a configuration of a first flash memory device and a second flash memory device in a flash memory system according to a second preferred embodiment of the present invention.

FIG. 12 illustrates a configuration of a first flash memory device 1200 and a second flash memory device 1201 in a flash memory system according to a second preferred embodiment of the present invention Proceeding according to the technique described, when incoming data 1204 is stored in the data blocks 1206 of the first flash memory device 1200, the physical block address (PBA1) of that data block is stored in a proper correlation blocks 1203 of the second flash memory device 1201. The proper correlation block includes within its range of VLB's the VLB of the incoming data 1204. Similarly, when incoming data 1205 is stored in the data blocks 1207 of the second flash memory device 1201, the physical block address (PBA2) of that data block is stored in a proper correlation block 1202 of the first flash memory device 1200. Those skilled in the art will understand that the "proper" correlation block will include within its range of VLB's the VLB of the incoming data 1205.

This technique can be expanded to flash memory systems having three or more flash memory devices. Essentially, the correlation information relating to the data stored in a particular flash memory device is not stored in the particular flash memory device. Instead, the correlation information relating to the data stored in the particular flash memory device is stored in a different flash memory device. This technique is applied to each flash memory device within the flash memory system having three or more flash memory devices.

FIG. 13 illustrates an example of a configuration of correlation blocks in a 64 MegaBit flash memory system according to a first preferred embodiment of the present invention. The 64 MegaBit flash memory system comprises one 64 MegaBit flash memory device having 1024 blocks, each block including 16 sectors, and a controller coupled to the 64 MegaBit flash memory device. The 64 MegaBit flash memory system supports slightly fewer than the 16,384 LBAs supported by the 8 correlation blocks because 8 blocks are configured as correlation blocks rather than data blocks, thus reducing the addressable storage capacity supported by the 64 MegaBit flash memory system, as explained above. In this example, each primary correlation block [1302, 1304, 1306, and 1308] is associated with one alternate correlation block [1322, 1324, 1326, and 1328].

Figure 14:
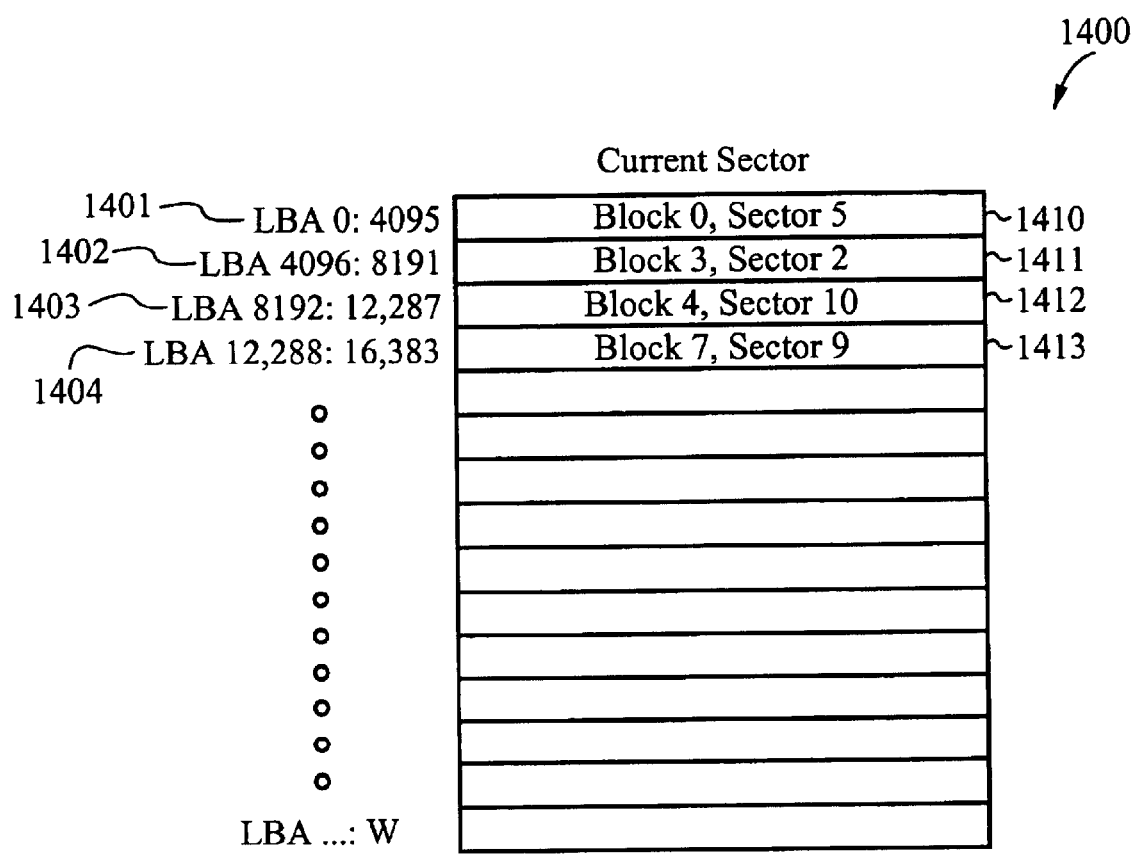
FIG. 14 illustrates a configuration of a volatile RAM array responsible for storing designations identifying current sectors in a 64 MegaBit flash memory system according to a first preferred embodiment of the present invention.

FIG. 14 illustrates a volatile RAM array 1400 of the 64 MegaBit flash memory system shown in FIG. 13. Each addressable volatile memory location 1410, . . . , 1413 has a corresponding predetermined range of logical block addresses 1401, . . . 1404. Each addressable volatile memory location 1410, . . . , 1413 stores the designation identifying the current sector associated with the corresponding predetermined range of logical block addresses 1401, . . . , 1404. LBA W represents the largest LBA supported by the controller of the 64 MegaBit flash memory system. To enhance understanding of the present invention, the information represented by the designations is shown rather than the actual implementation of the designations. It should be understood by those skilled in the art that a binary implementation of the designation will be used to practice the present invention.

The above figures are merely intended to illustrate a particular implementation of the present invention, but are not intended to limit the scope of the present invention to this particular implementation.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

What is claimed is:

1. A flash memory device having at least one flash memory array for storing incoming data sent from a host system, the flash memory device comprising:
   a plurality of separate, independently addressable, independently programmable and independently erasable non-volatile physical memory blocks distinguishably defined by a plurality of physical block addresses, including:
   a. at least one data block for storing incoming data, a first data block defined by a first physical block address; and
   b. at least one correlation block for storing correlation data within each flash memory array, a first correlation block defined by a second physical block address.

2. The flash memory device according to claim 1 wherein each physical memory block is identically comprised of a plurality of separately addressable sectors.

3. The flash memory device according to claim 2 wherein the sectors within the first data block each comprise a data field and an extension field, including a first sector defined by a first sector address, each data field capable of storing a logical block of incoming data defined by a logical block address selected from among a plurality of available logical block addresses, including a first logical block of incoming data defined according to a first logical block address stored in the first sector.

4. The flash memory device according to claim 3 wherein each sector within the first data block comprises an error correction code field and a flag field.

5. The flash memory device according to claim 3 wherein each correlation block is comprised of a plurality of separately addressable correlation sectors addressed according to a first set of sector addresses.

6. The flash memory device according to claim 5 wherein each sector within a correlation block is comprised of a plurality of fields for storing a physical block address.

7. The flash memory device according to claim 6 further comprising means for correlating a first predetermined range of logical block addresses to the first correlation block.

8. The flash memory device according to claim 7 wherein the means for correlating a first predetermined range of logical block addresses to the first correlation block comprises a volatile RAM array with a first register identifying the first correlation block.

9. The flash memory device according to claim 8 wherein the first register is further capable of identifying a current sector within the first correlation block.

10. The flash memory device according to claim 9 further comprising at least one alternate correlation block, wherein each alternate correlation block is configured to store a physical block address corresponding to a logical block address of data, further wherein each alternate correlation block is associated with a primary correlation block and wherein each alternate correlation block is configured to store physical block addresses corresponding to a predetermined range of logical block addresses associated with its primary correlation block.

11. The flash memory device according to claim 10 wherein if a free sector is not found in a primary correlation block, a physical block address corresponding to the logical block address of data and an unchanged correlation information from the current sector associated with the predetermined range of logical block addresses are stored in the alternate correlation block.

12. The flash memory device according to claim 11 wherein if a free sector is not found in an alternate correlation block, a physical block address corresponding to a logical block address of data and the unchanged correlation information from the current sector associated with the predetermined range of logical block addresses are stored in an erased primary correlation block.

13. A method of storing digital data within a flash memory system having at least one flash memory array comprising the steps of:
   a. mapping a non-volatile memory medium within the flash memory system into a plurality of independently addressable, independently programmable and independently erasable nonvolatile physical memory blocks including a plurality of data blocks including a first data block defined by a first physical block address and at least one correlation block for storing correlation data within each flash memory array comprising a first correlation block defined by a second physical block address;
   b. mapping each of the plurality of data blocks into a plurality of sectors, a plurality of sectors within the first data block distinguishably defined by sector addresses including a first sector defined by a first sector address;
   c. mapping each correlation block into a plurality of sectors, the plurality of sectors within the first correlation block distinguishably defined by sector addresses including a second sector defined by a second sector address;
   d. mapping each of the plurality of sectors within each correlation block into a plurality of fields, including a first field within the second sector, each field capable of storing a physical block address; and
   e. assigning a first predetermined range of logical block addresses to the second physical block address and the second sector address, wherein the first predetermined range of logical block addresses contains a second predetermined range and a third predetermined range of logical block addresses.

14. The method according to claim 13 further comprising the steps:
   a. determining that a correlation block is defective; and
   b. allocating a non-defective block to replace the defective correlation block.

15. The method according to claim 13 further comprising a second flash memory system, the method further comprising the steps:
   a. mapping a non-volatile memory medium within the second flash memory system into a plurality of independently addressable, independently programmable and independently erasable memory blocks including a plurality of data blocks including a second data block defined by a third physical block address and at least one correlation block comprising a second correlation block defined by a fourth physical block address;
   b. mapping each of the plurality of data blocks within the second flash memory system into a plurality of sectors, a plurality of sectors within the second data block distinguishably defined by sector addresses including a third sector defined by a third sector address;
   c. mapping each correlation block within the second flash memory system into a plurality of sectors, the plurality of sectors within the second correlation block distinguishably defined by sector addresses including a fourth sector defined by a fourth sector address;
   d. mapping each of the plurality of sectors within each of the correlation blocks within the second flash memory system into a plurality of fields, including a first field within the fourth sector, each field capable of storing a physical block address; and
   e. assigning a fourth predetermined range of logical block addresses to the fourth physical block address and the fourth sector address, wherein the fourth predetermined range of logical block addresses contains a fifth predetermined range and a sixth predetermined range of logical block addresses.

16. The method according to claim 15 further comprising the steps:
   a. receiving from a host a first set of incoming data defined according to a first logical block address, the first logical block address being within the second predetermined range of logical block addresses;
   b. storing the first set of incoming data in the second data block defined according to the third physical block address;
   c. relating the second predetermined range of logical block addresses to the first field within the second sector; and
   d. storing the third physical block address in the first field.

17. The method according to claim 16 wherein the first correlation block comprises a fifth sector defined by a fifth sector address incrementally following the second sector address, the fifth sector further comprising a second field and a third field, the method further comprising the steps:
   a. receiving from a host a second set of incoming data defined according to a second logical block address, the second logical block address being within the third predetermined range of logical block addresses;
   b. storing the second set of data in the a third data block defined according to a fifth physical block address, the third data block being located in the second flash memory system;
   c. assigning the first predetermined range of logical block addresses to the second physical block address and the fifth sector address;
   d. relating the second predetermined range of logical block addresses to the second field;
   e. copying the third physical block address from the first field into the second field;
   f. relating the third predetermined range of logical block addresses to the third field; and
   g. storing the fifth physical block address in the third field.

18. The method according to claim 13 further comprising the steps:
   a. receiving from a host a first set of incoming data defined according to a first logical block address, the first logical block address being within the second predetermined range of logical block addresses;
   b. storing the first set of incoming data in the first data block defined according to the first physical block address;
   c. relating the second predetermined range of logical block addresses to the first field within the second sector; and
   d. storing the first physical block address in the first field.

19. The method according to claim 18 wherein the first correlation block comprises a third sector defined by a third sector address incrementally following the second sector address, the third sector further comprising a second field and a third field, the method further comprising the steps:

a. receiving from a host a second set of incoming data defined according to a second logical block address, the second logical block address being within the third predetermined range of logical block addresses;

b. storing the second set of incoming data in a second data block defined according to a third physical block address;

c. assigning the first predetermined range of logical block addresses to the second physical block address and the third sector address;

d. relating the second predetermined range of logical block addresses to the second field;

e. copying the first physical block address from the first field into the second field;

f. relating the third predetermined range of logical block addresses to the third field; and g. storing the third physical block address in the third field.

20. The method according to claim 18 further comprising a second correlation block defined according to a third physical block address, the second correlation block comprising a third sector defined by a third sector address, the third sector further comprising a second field and a third field, the method further comprising the steps:

a. receiving from a host a second set of incoming data defined according to a second logical block address, the second logical block address being within the third predetermined range of logical block addresses;

b. storing the second set of incoming data in the second data block defined according to a fourth physical block address;

c. assigning the first predetermined range of logical block addresses to the third physical block address and the third sector address;

d. relating the second predetermined range of logical block addresses to the second field;

e. copying the first physical block address from the first field into the third field;

f. relating the third predetermined range of logical block addresses to the third field; and g. storing the fourth physical block address in the third field.

21. The method according to claim 20 further comprising the step of erasing the first correlation block.

* * * * *

UNITED STATES PATENT AND TRADEMARK OFFICE
CERTIFICATE OF CORRECTION

PATENT NO. : 6,772,274 B1
DATED : August 3, 2004
INVENTOR(S) : Petro Estakhi

It is certified that error appears in the above-identified patent and that said Letters Patent is hereby corrected as shown below:

Title page,
Item [57], ABSTRACT, delete "mappmg" and insert -- mapping --.

Column 2,
Lines 19-21, delete "Not only does the erase operation entail erasing the typical flash memory cell but additionally can results in the overerasure of the typical flash memory cell."
and insert -- Not only does the erase operation entail erasing the typical flash memory cell but additionally requires programming the typical flash memory cell for the erase operation before executing the erase operation. As such, the cell is first programmed to a high threshold voltage. Electrical erase pulses are then applied to the memory cell to remove the stored changes. Failure to program the typical flash memory cell for the erase operation can result in the overerasure of the typical flash memory cell by dislodging bound electrons in the floating gate and driving them away. When the floating gate becomes deplete in this manner, the typical flash memory cell can no longer properly operate. --.

Column 3,
Line 54, delete "1 12" and insert -- 112 --.

Column 13,
Line 31, delete ", 422. in each" and insert -- , 422 in each --.

Signed and Sealed this

Twenty-fourth Day of May, 2005

JON W. DUDAS
*Director of the United States Patent and Trademark Office*